(12) United States Patent
Shibata

(10) Patent No.: US 9,736,239 B2
(45) Date of Patent: Aug. 15, 2017

(54) INFORMATION PROCESSING APPARATUS, CONTROL METHOD FOR INFORMATION PROCESSING APPARATUS, INFORMATION PROCESSING SYSTEM, AND STORAGE MEDIUM

(71) Applicant: CANON KABUSHIKI KAISHA, Tokyo (JP)

(72) Inventor: Daisuke Shibata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 14/812,720

(22) Filed: Jul. 29, 2015

(65) Prior Publication Data

US 2016/0036631 A1    Feb. 4, 2016

(30) Foreign Application Priority Data

Jul. 31, 2014    (JP) ................. 2014-156288

(51) Int. Cl.
*H04L 12/24* (2006.01)
*H04L 29/08* (2006.01)
*G06F 3/12* (2006.01)
*G06F 11/00* (2006.01)

(52) U.S. Cl.
CPC ............ *H04L 67/1095* (2013.01); *G06F 3/12* (2013.01); *G06F 11/00* (2013.01); *H04L 41/0813* (2013.01); *H04L 41/0873* (2013.01); *H04L 67/125* (2013.01)

(58) Field of Classification Search
CPC ........ G06F 11/00; G06F 11/3409; G06F 3/12; G06F 3/1203; G06F 3/1253; G06F 3/1254; G06F 3/1255; H04L 67/10; H04L 67/125; H04L 41/0813; H04L 41/0863; H04L 41/0873; H04L 43/08; H04L 67/1095
USPC ......................................... 709/221
See application file for complete search history.

(56) References Cited

U.S. PATENT DOCUMENTS

| 8,190,719 | B2 * | 5/2012 | Furukawa | H04L 41/0869 370/352 |
| 9,032,286 | B2 * | 5/2015 | Sugaya | H04N 1/00204 715/234 |
| 9,367,777 | B2 * | 6/2016 | Matsuda | G06F 3/1203 |
| 9,590,853 | B1 * | 3/2017 | Das | H04L 41/0813 |
| 2013/0257627 | A1 * | 10/2013 | Rafael | G05B 19/042 340/691.6 |
| 2015/0029552 | A1 * | 1/2015 | Nishizawa | G06F 3/1253 358/1.15 |

FOREIGN PATENT DOCUMENTS

JP         2013-001044 A    1/2013

* cited by examiner

*Primary Examiner* — Ruolei Zong
(74) *Attorney, Agent, or Firm* — Canon USA, Inc., IP Division

(57) ABSTRACT

An information processing apparatus synchronizes setting information between a plurality of devices and performs control to cancel, in a case where, if setting information that a device uses is changed, a plurality of pieces of setting information that another device uses becomes mismatched with one another, the setting information from being changed.

18 Claims, 16 Drawing Sheets

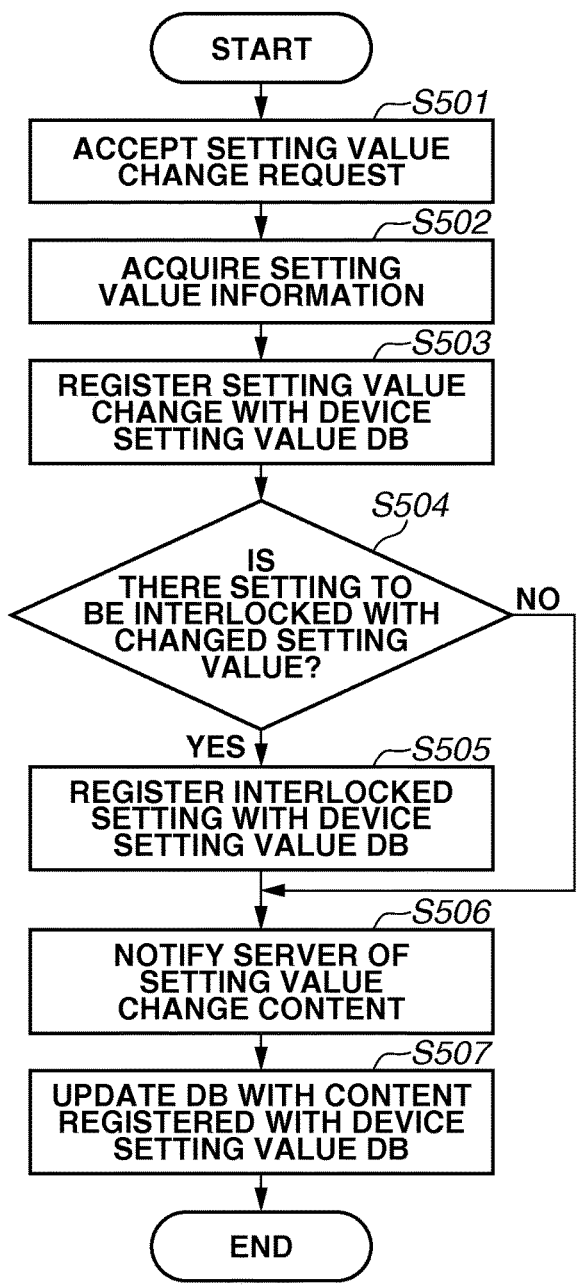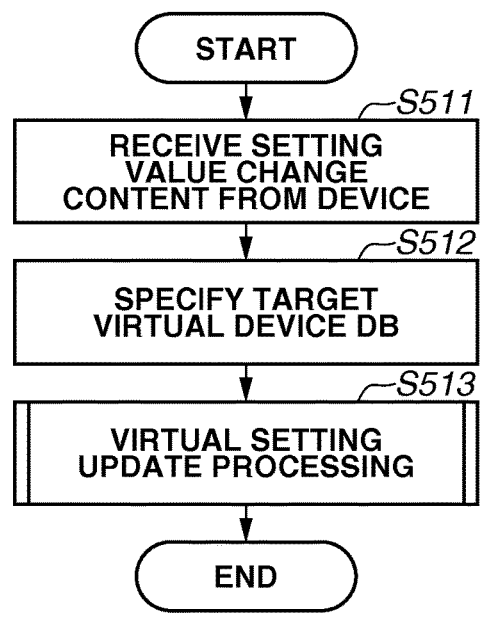

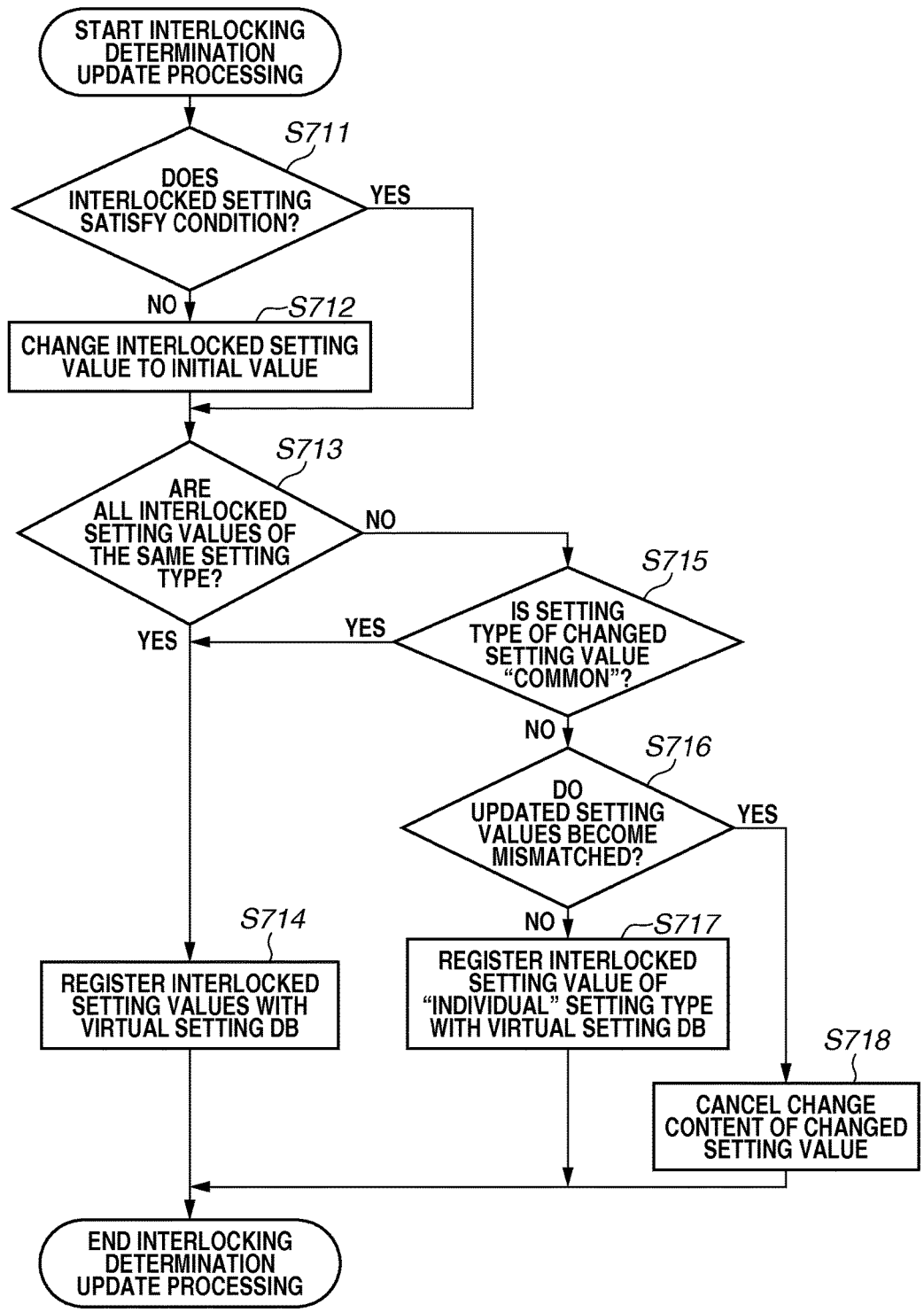

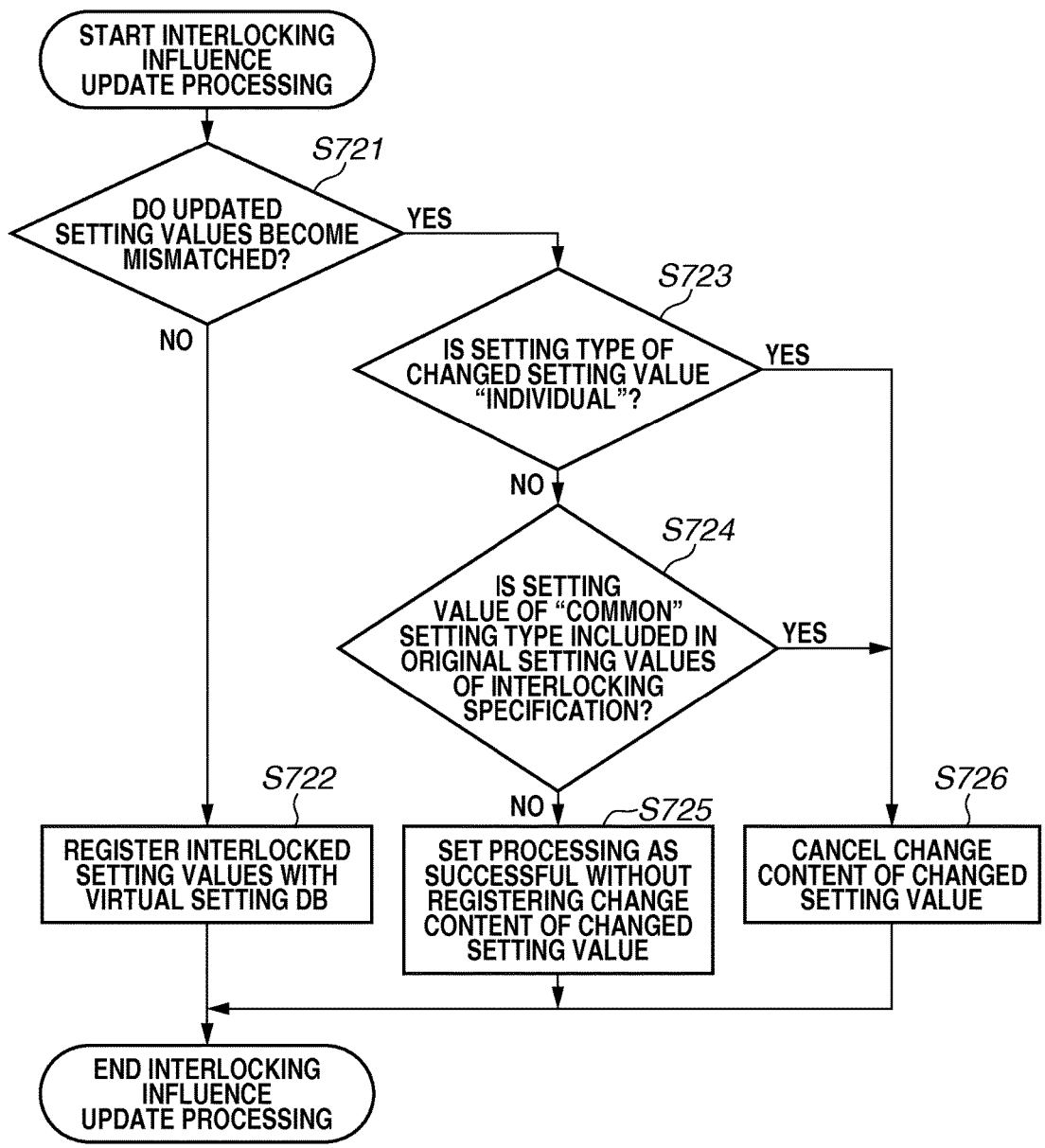

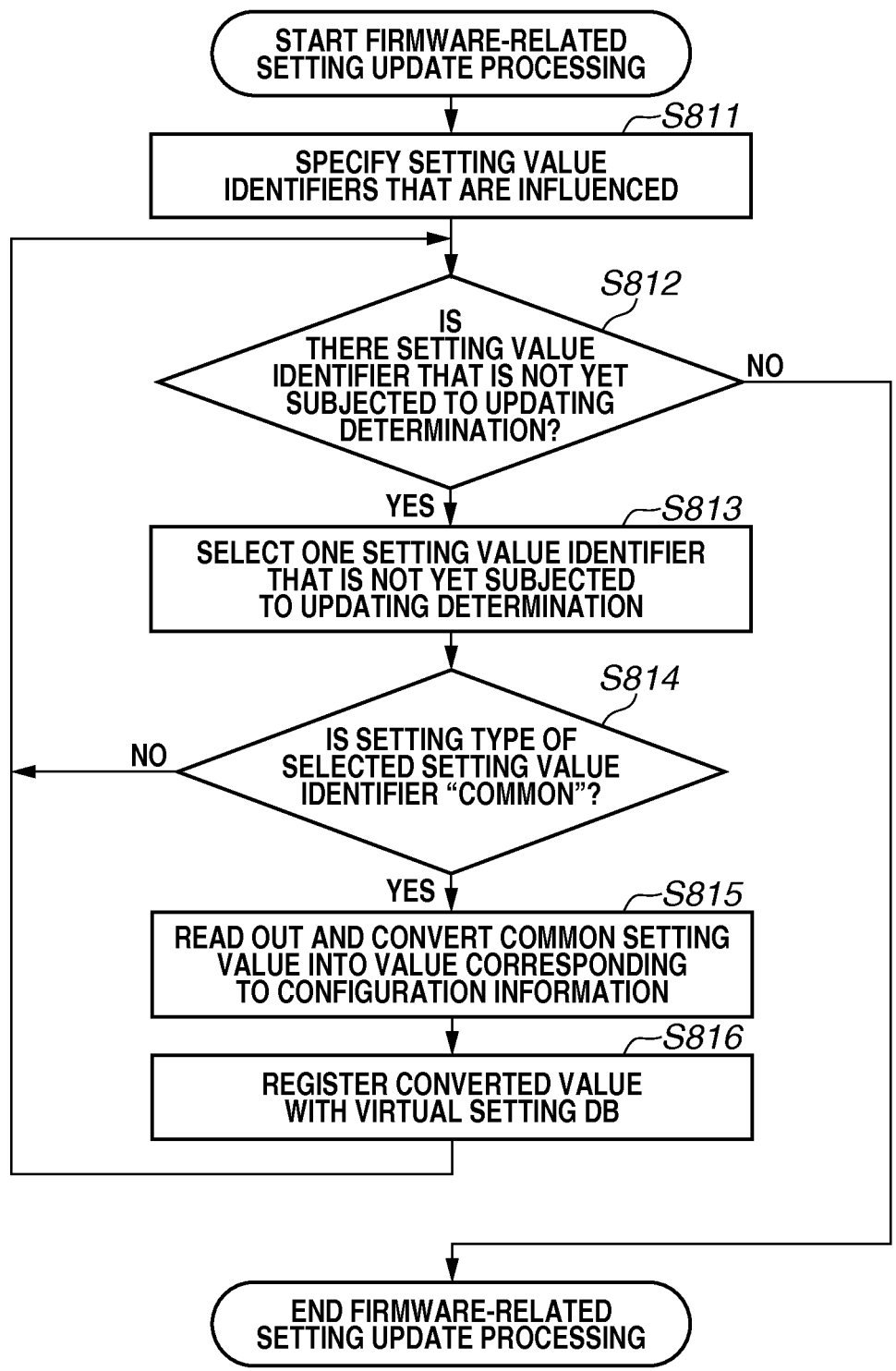

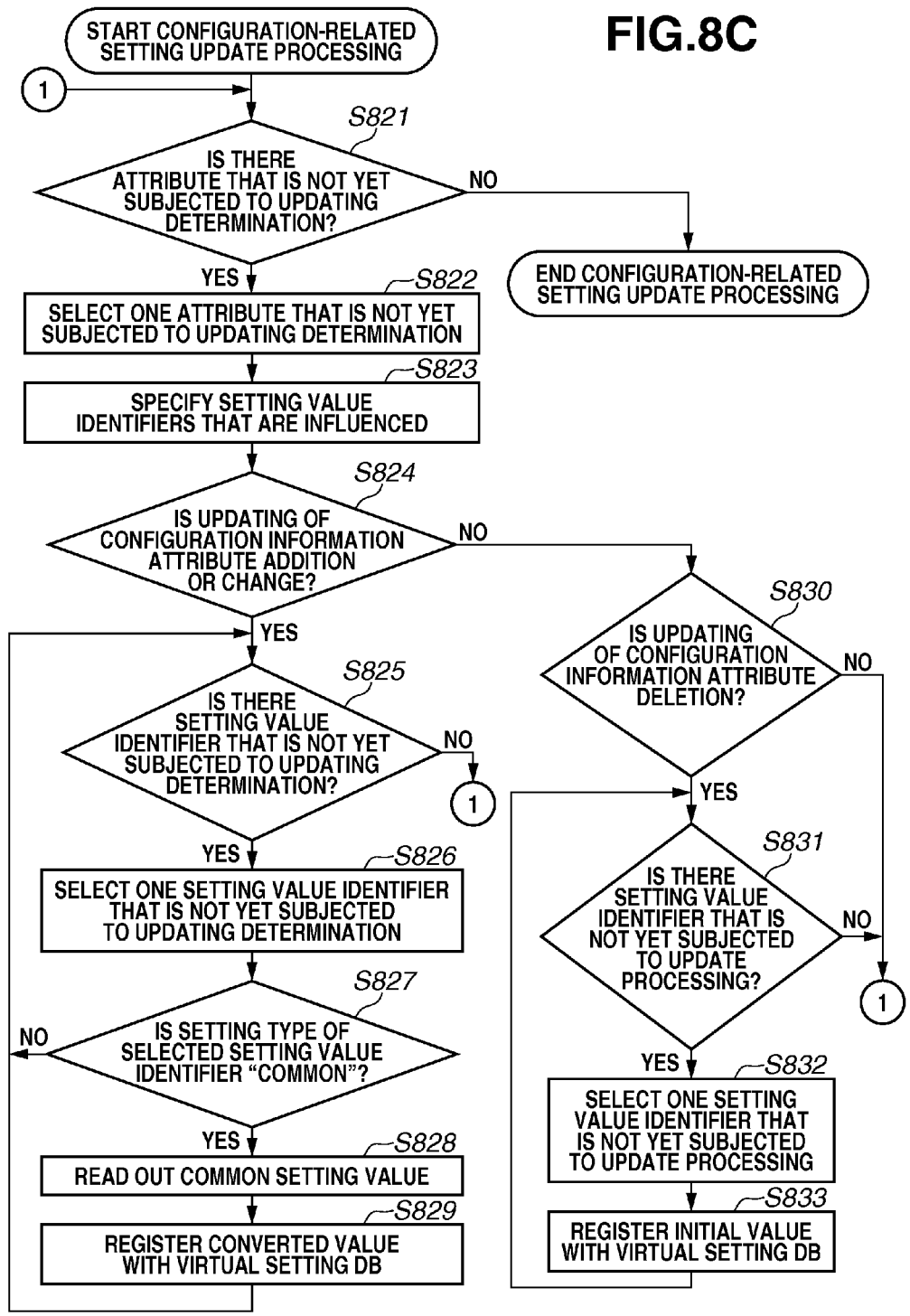

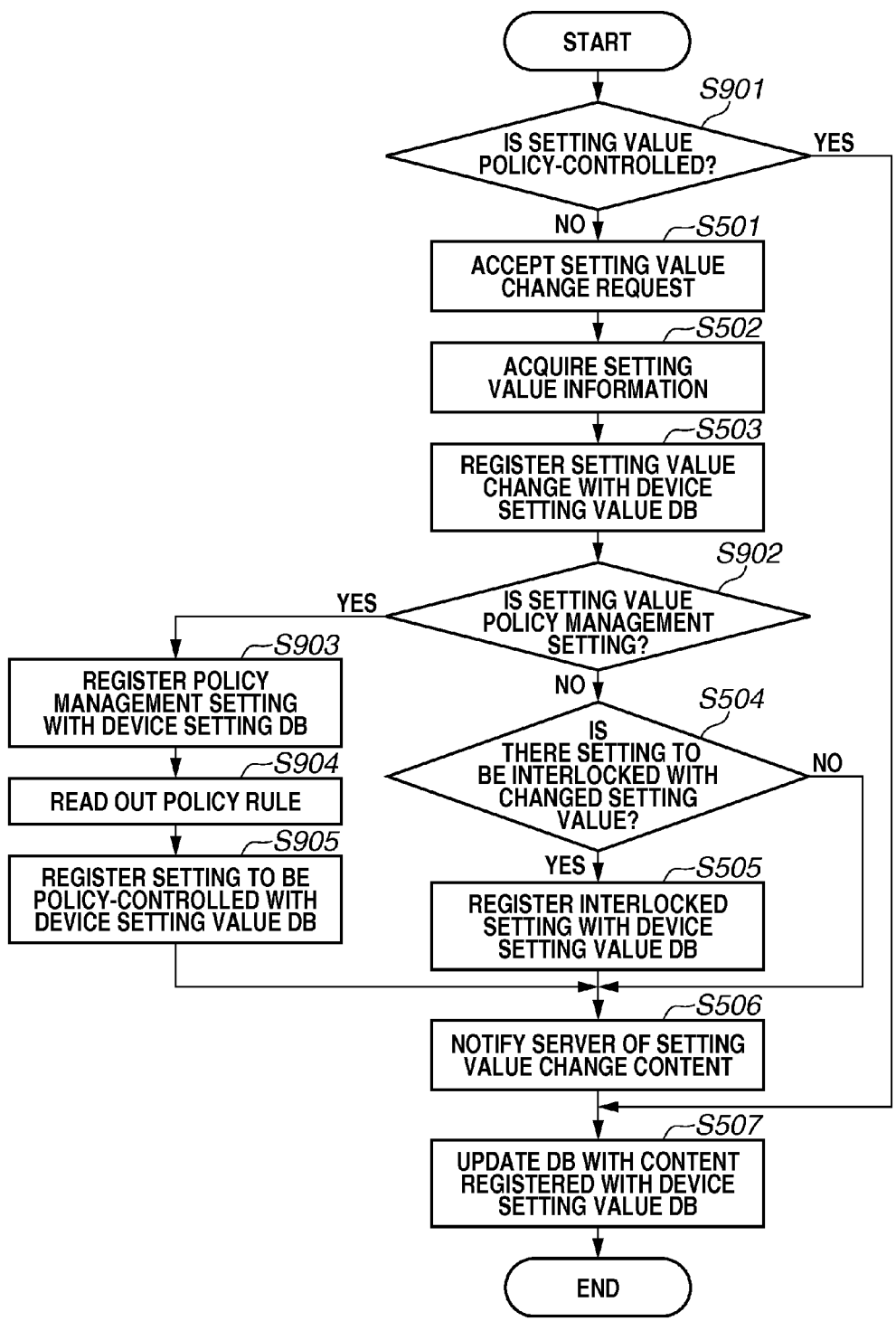

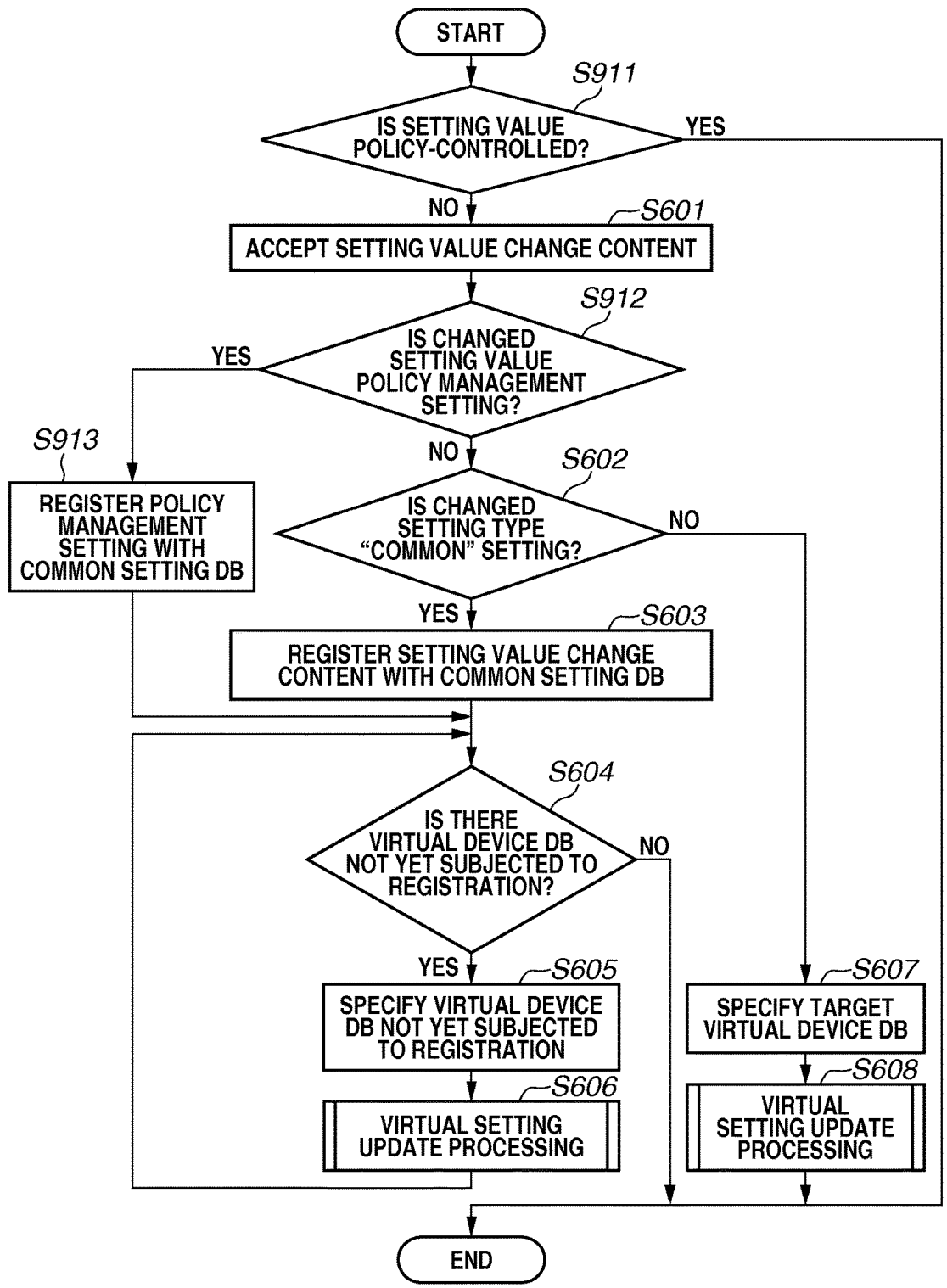

INFORMATION PROCESSING APPARATUS, CONTROL METHOD FOR INFORMATION PROCESSING APPARATUS, INFORMATION PROCESSING SYSTEM, AND STORAGE MEDIUM

BACKGROUND

Technical Field

Aspects of the present invention generally relate to a synchronization system used to synchronize setting information.

Description of the Related Art

Some information processing apparatuses, such as multifunction peripherals, store setting values (configuration data) used to switch operations thereof. In environments in which a plurality of such information processing apparatuses is used, it is conventionally necessary to individually manage setting values for respective information processing apparatuses.

To save the effort of such management, there is a technique to store setting values in another information processing apparatus, such as a server, connected to a network (hereinafter referred to simply as a "server") and to manage individual setting values used for the respective information processing apparatuses and common setting values used for all of the information processing apparatuses.

There is also a technique to set setting values collectively managed in the server to the respective information processing apparatuses.

In a system discussed in Japanese Patent Application Laid-Open No. 2013-1044, when a setting value has been changed in an information processing apparatus, the information processing apparatus notifies a server of the content of the change, thus enabling the server to synchronize with the change of the setting value of the information processing apparatus.

In the conventional techniques, if respective pieces of setting information (respective setting values) are allowed to be changed in both the information processing apparatus and the server, a change of a piece of setting information may cause another piece of setting information to become mismatched.

SUMMARY

Exemplary embodiments described below include a scheme capable of preventing the occurrence of a state in which setting values become mismatched.

According to an aspect of the present invention, an information processing apparatus that communicates with a first device and a second device includes a management unit configured to manage a plurality of pieces of setting information that the first device uses and a plurality of pieces of setting information that the second device uses, an acceptance unit configured to accept a change instruction for changing setting information that the first device uses, a processing unit configured to perform synchronization processing for synchronizing at least a part of pieces of setting information from among the plurality of pieces of setting information that the first device uses and at least a part of pieces of setting information from among the plurality of pieces of setting information that the second device uses, and a control unit configured to, in a case where, if setting information that the second device uses is synchronized with setting information obtained by changing the setting information that the first device uses according to the change instruction, the plurality of pieces of setting information that the second device uses becomes mismatched with one another, cancel the setting information that the first device uses from being changed according to the change instruction.

Further features of the present disclosure will become apparent from the following description of exemplary embodiments with reference to the attached drawings.

BRIEF DESCRIPTION OF THE DRAWINGS

FIGS. 5A and 5B are flowcharts illustrating processing performed when a device setting value has been changed in the multifunction peripheral according to a first exemplary embodiment.

FIG. 7B is a flowchart illustrating interlocking determination update processing according to the first exemplary embodiment.

FIG. 7C is a flowchart illustrating interlocking influence update processing according to the first exemplary embodiment.

FIG. 8B is a flowchart illustrating firmware-related setting update processing according to the second exemplary embodiment.

FIG. 8C is a flowchart illustrating configuration-related setting update processing according to the second exemplary embodiment.

FIG. 9A is a flowchart illustrating processing performed when a device setting value has been changed in the multifunction peripheral according to a third exemplary embodiment.

FIG. 9B is a flowchart illustrating setting value change processing performed by the setting value management server according to the third exemplary embodiment.

DESCRIPTION OF THE EMBODIMENTS

Various exemplary embodiments will be described in detail below with reference to the drawings. In the following exemplary embodiments, a multifunction peripheral is used as an example of an information processing apparatus. The following exemplary embodiments are not seen to be limiting, and not all of the combinations of features described in the exemplary embodiments are essential for solutions in the present disclosure.

Figure 1:
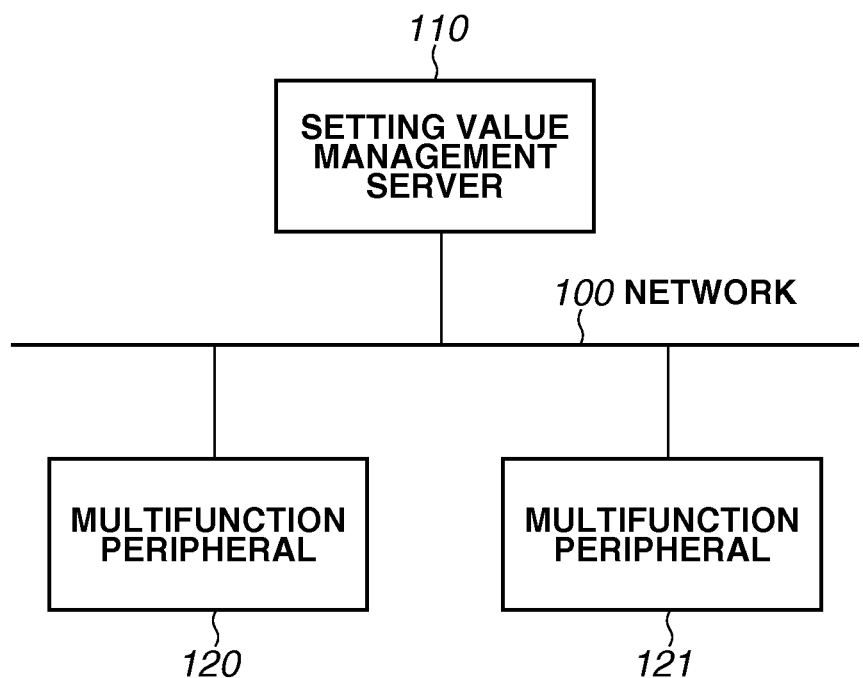
FIG. 1 illustrates an overall configuration of a setting value synchronization system according to an exemplary embodiment.

FIG. 1 is a system configuration diagram illustrating an example of an overall configuration of a setting value synchronization system according to an exemplary embodiment.

As illustrated in FIG. 1, the setting value synchronization system according to the present exemplary embodiment includes a setting value management server 110 and a plurality of multifunction peripherals 120 and 121, which are interconnected via a network 100, such as a local area network (LAN) or the Internet.

The setting value management server 110 (an information processing apparatus) manages setting values (setting information) of the multifunction peripheral 120 and the multifunction peripheral 121 (devices) as virtual device settings. In a case where a virtual device setting has been changed, the setting value management server 110, when accepting a change difference acquisition request from the multifunction peripheral 120 or 121 via the network 100, notifies that multifunction peripheral of a difference between the changed virtual device setting and the setting value of that multifunction peripheral. Furthermore, when receiving change information of the setting value from the multifunction peripheral 120 or 121, the setting value management server 110 changes, based on the received change information, the value of the virtual device setting that the setting value management server 110 itself manages.

The setting value management server 110 is an information processing apparatus that synchronizes setting information between a plurality of devices. in a case where, if setting information that a device uses is changed, a plurality of pieces of setting information that another device uses becomes mismatched with one another, the setting value management server 110 performs control to cancel changing of the setting information. In this way, the setting value management server 110 can maintain matching of setting information as the whole system.

The multifunction peripheral 120 is an information processing apparatus, such as an image forming apparatus, capable of implementing a plurality of types of functions, such as copying and facsimile (FAX), and stores therein setting values used to implement those functions. When a setting value to be used in the multifunction peripheral 120 itself has been changed, the multifunction peripheral 120 notifies the setting value management server 110 via the network 100 of the change information. Furthermore, the multifunction peripheral 120 transmits a change difference acquisition request in the virtual device setting to the setting value management server 110, acquires, from the setting value management server 110, a difference between the changed virtual device setting and the setting value of the multifunction peripheral 120 itself, and changes the setting value of the multifunction peripheral 120 itself using the acquired difference.

Furthermore, in the present exemplary embodiment, a multifunction peripheral is used an example of an information processing apparatus that synchronizes the setting value of the information processing apparatus itself with the setting value management server 110. However, the information processing apparatus that synchronizes with the setting value management server 110 may be any apparatus as long as it stores the setting value used to implement a function thereof and is capable of communicating with the setting value management server 110 via a network. For example, a personal computer or a network home electric apparatus may be used.

Furthermore, depending on setting values, the values may be synchronized between a plurality of multifunction peripherals, such as the multifunction peripheral 120 and the multifunction peripheral 121. With regard to such setting values, in a case where a virtual device setting has been changed on the setting value management server 110, change information about the setting values is notified to both the multifunction peripheral 120 and the multifunction peripheral 121. Moreover, in a case where the setting value of any one of the multifunction peripheral 120 and the multifunction peripheral 121 has been changed, the change information is first notified to the setting value management server 110 and, then, the change information is also notified to the other multifunction peripheral via the setting value management server 110. In addition, three or more information processing apparatuses, such as multifunction peripherals, may be included in the setting value synchronization system.

As mentioned in the foregoing, the setting value synchronization system according to the present exemplary embodiment is a management system for managing setting values in which a plurality of information processing apparatuses and a management apparatus for managing a plurality of setting values used to determine operations of the plurality of information processing apparatuses are able to communicate with each other via a network.

The details of the setting value management server 110 and the multifunction peripherals 120 and 121 are described below. In this instance, the multifunction peripheral 120 is described as an example, and it is supposed that the multifunction peripheral 121 has a configuration similar to that of the multifunction peripheral 120.

Figure 2:
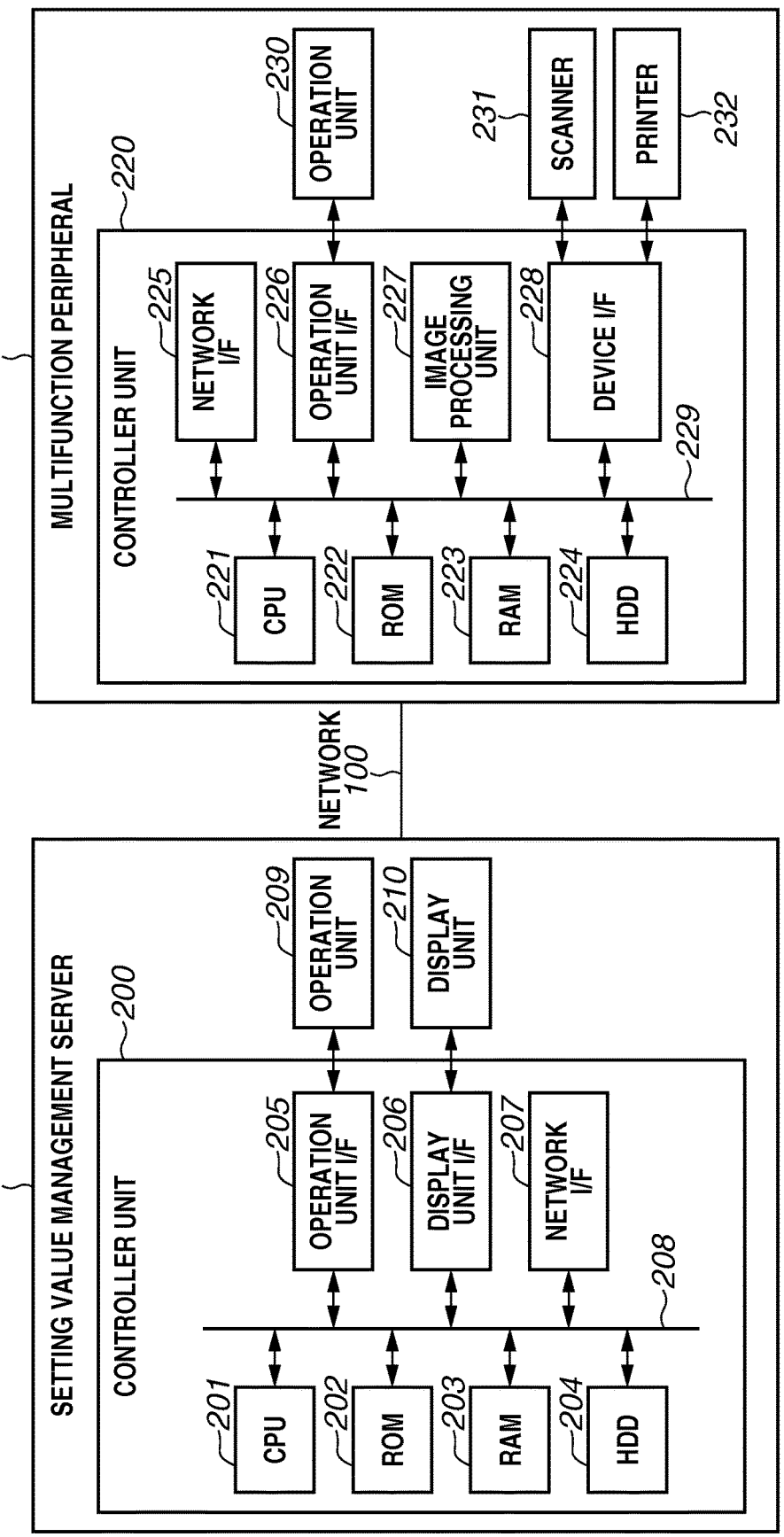
FIG. 2 illustrates hardware configurations of a setting value management server and a multifunction peripheral.

FIG. 2 is a block diagram illustrating an example of hardware configurations of the setting value management server 110 and the multifunction peripheral 120.

First, the setting value management server 110 is described below.

The setting value management server 110 includes a controller unit 200, an operation unit 209, and a display unit 210. The controller unit 200 includes a central processing unit (CPU) 201. The CPU 201 activates an operating system (OS) stored in a hard disk drive (HDD) 204 using a boot program stored in a read-only memory (ROM) 202. The CPU 201 executes application programs stored in the HDD 204 to perform various processing operations. A random access memory (RAM) 203 is used as a work area for the CPU 201. The HDD 204 stores the above-mentioned application programs and virtual device settings corresponding to the setting values of the multifunction peripheral 120. The details of a management method for virtual device settings are described below.

An operation unit interface (I/F) 205, a display unit I/F 206, and a network I/F 207 as well as the ROM 202 and the RAM 203 are connected to the CPU 201 via a system bus 208. The operation unit I/F 205 is an interface with the operation unit 209, which is composed of a mouse, a keyboard, etc., and sends to the CPU 201 information input by the user via the operation unit 209. The display unit I/F 206 outputs to the display unit 210 image data to be displayed on the display unit 210, which is composed of a display, etc. Furthermore, the network I/F 207 is connected to the network 100 and inputs information from and outputs information to each apparatus on the network 100 via the network 100.

Next, the multifunction peripheral 120 is described.

The multifunction peripheral 120 includes a controller unit 220, an operation unit 230, a scanner 231, and a printer 232. The operation unit 230, the scanner 231, which is an image input device, and the printer 232, which is an image output device, are connected to the controller unit 220.

The controller unit 220 includes a CPU 221. The CPU 221 activates an OS stored in an HDD 224 using a boot program stored in a ROM 222. The CPU 221 executes application programs stored in the HDD 224 on the OS to perform various processing operations. A RAM 223 is used as a work area for the CPU 221. The RAM 223 also provides, as well as the work area, an image memory region for temporarily storing image data. The HDD 224 stores the above-mentioned application programs, image data, and various setting values. A management method for managing setting values in the multifunction peripheral 120 is described below.

An operation unit interface (I/F) 226, a device I/F 228, a network I/F 225, and an image processing unit 227 as well as the ROM 222 and the RAM 223 are connected to the CPU 221 via a system bus 229. The operation unit I/F 226 is an interface with the operation unit 230, which includes a touch panel, and outputs to the operation unit 230 image data to be displayed on the operation unit 230. Furthermore, the operation unit I/F 226 sends to the CPU 221 information input by the user via the operation unit 230. The scanner 231 and the printer 232 are connected to the device I/F 228, and the device I/F 228 performs the conversion of synchronous data/asynchronous data of image data. The network I/F 225 is connected to the network 100 and inputs information from and outputs information to each apparatus on the network 100 via the network 100. The image processing unit 227 performs various processing operations, such as input image processing from the scanner 231, output image processing to the printer 232, image rotation, image compression, resolution conversion, color space conversion, and gradation conversion.

Figure 3:
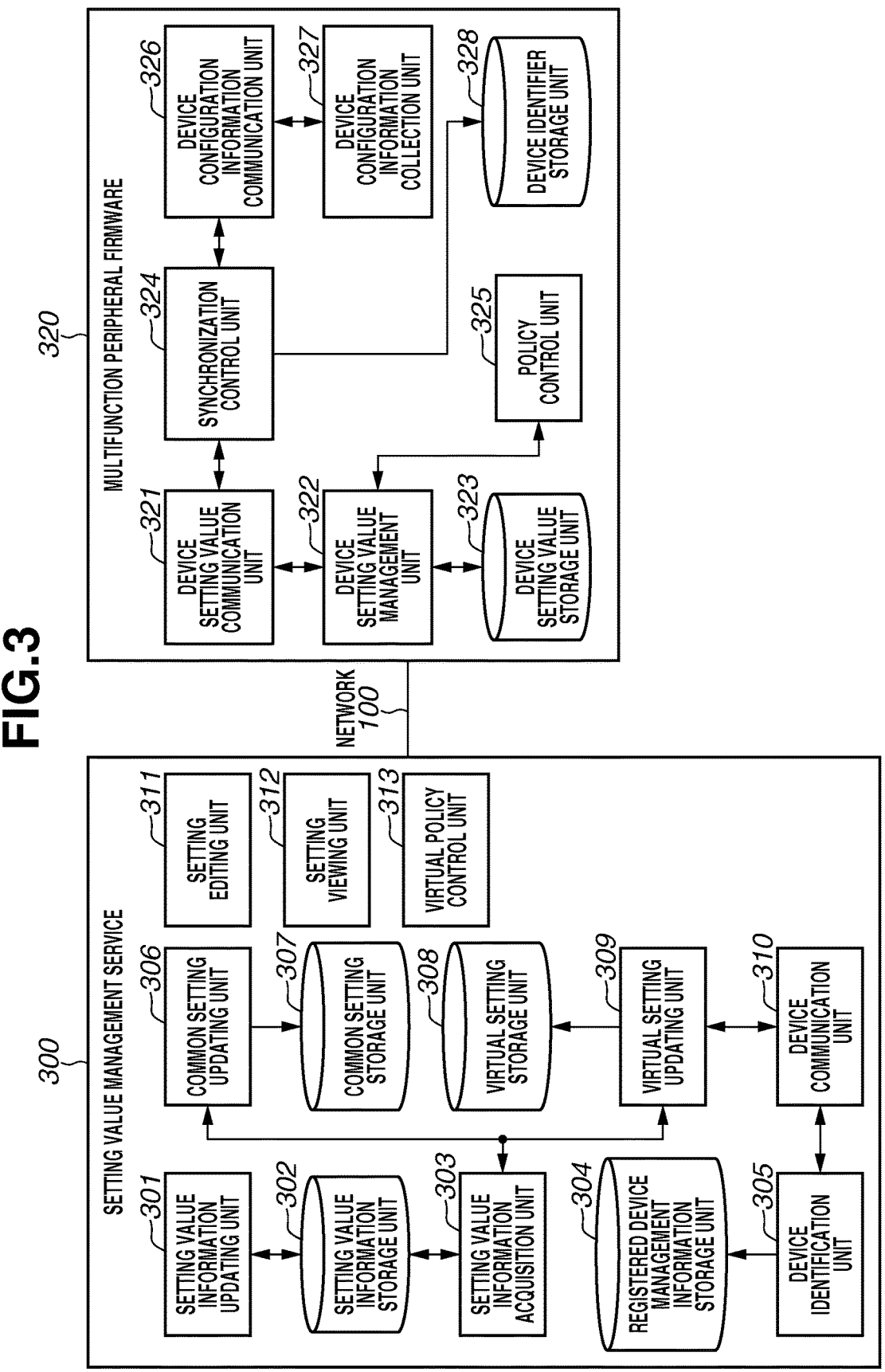
FIG. 3 illustrates software configurations of the setting value management server and the multifunction peripheral.

FIG. 3 is a block diagram illustrating an example of software configurations of the setting value management server 110 and the multifunction peripheral 120.

First, functional units included in the multifunction peripheral 120 are described.

The functional units included in the multifunction peripheral 120 are implemented by the CPU 221 of the multifunction peripheral 120 illustrated in FIG. 2 reading and executing multifunction peripheral firmware 320 stored in the ROM 222.

A device setting value storage unit 323 stores setting values (configuration data) used to switch operations of the multifunction peripheral 120, as a device setting value database (DB), in the HDD 224. The multifunction peripheral 120 switches manners of operations thereof based on the setting values stored in the device setting value storage unit 323. Examples of the setting values stored in the device setting value DB are described below with reference to Table 7.

A device setting value management unit 322 manages the acquisition and updating of the setting values stored by the device setting value management unit 322. When accepting an acquisition request for a setting value from a unit (not illustrated) included in the multifunction peripheral 120, the device setting value management unit 322 acquires the setting value from the device setting value storage unit 323 and returns the acquired setting value to the unit (not illustrated). Furthermore, when accepting a change request for a setting value, the device setting value management unit 322 updates the setting value stored in the device setting value storage unit 323 and causes a device setting value communication unit 321 to notify the setting value management server 110 of at least a setting value identifier and a changed value of the setting value requested to be changed.

Moreover, when the device setting value communication unit 321 has acquired a setting value from the setting value management server 110, the device setting value management unit 322 causes the device setting value storage unit 323 to store the acquired setting value into the device setting value DB.

The device setting value communication unit 321 is a unit that performs communication with the setting value management server 110 about information related to setting values of the multifunction peripheral 120. When requested by a synchronization control unit 324 to acquire the changed setting value from the setting value management server 110, the device setting value communication unit 321 notifies the setting value management server 110 of a setting value acquisition request. Furthermore, when requested by the device setting value management unit 322 to update the setting value, the device setting value communication unit 321 notifies the setting value management server 110 of a setting value updating request.

A device identifier storage unit 328 stores, in the HDD 224, an individual identifier used for uniquely identifying the individual multifunction peripheral 120. When communicating with the setting value management server 110, the multifunction peripheral 120 identifies the individual itself using the individual identifier stored by the device identifier storage unit 328.

The synchronization control unit 324 is a unit that controls the synchronization of a setting value with the setting value management server 110. The synchronization control unit 324 determines the timing of synchronizing information of the multifunction peripheral 120 with the setting value management server 110, and invokes the device setting value communication unit 321 and a device configuration information communication unit 326. To invoke each of the device setting value communication unit 321 and the device configuration information communication unit 326, the synchronization control unit 324 acquires the individual identifier from the device identifier storage unit 328 and passes the acquired individual identifier to each of the device setting value communication unit 321 and the device configuration information communication unit 326. The timing at which the synchronization control unit 324 invokes each of the device setting value communication unit 321 and the device configuration information communication unit 326 may be at intervals of a predetermined time or may be the timing corresponding to a device operation (the time of activation of the device, the transition to sleep mode, the restoration from sleep mode, or the time set by the user). For example, when a device is activated, the synchronization control unit 324 requests the device configuration information communication unit 326 to update device configuration information, and, after the activation of the device, periodically requests the device setting value communication unit 321 to acquire an update difference obtained by updating the setting value of the multifunction peripheral 120.

A device configuration information collection unit 327 collects device configuration information of the multifunction peripheral 120 and stores the device configuration information into the RAM 223 or the HDD 224. The device configuration information, which the device configuration information collection unit 327 collects, includes, for example, model code, which is used to identify the model, firmware version, accessory configuration, and software license, but is not limited to such information. This device configuration information is information systematized in the same manner as that of device configuration information stored in a configuration information DB 415 (FIG. 4), which is described below.

The device configuration information communication unit 326 is a unit that performs communication of information related to device configuration information with the setting value management server 110. When requested by the synchronization control unit 324 to update device configuration information, the device configuration information communication unit 326 invokes the device configuration information collection unit 327 to collect device configuration information, and notifies the setting value management server 110 of the collected device configuration information together with the individual identifier.

In addition, a policy control unit 325 is described in a third exemplary embodiment, which is described below.

Next, various functional units of a setting value management service 300 included in the setting value management server 110 are described.

The setting value management service 300 is a service that provides a function to manage setting values of the multifunction peripherals 120 and 121. In the present exemplary embodiment, the setting value management service 300 is provided by the setting value management server 110. Furthermore, while an example in which the setting value management server 110 and the multifunction peripheral 120 are interconnected is illustrated in FIG. 3, this is not restrictive. For example, a certain multifunction peripheral may provide the setting value management service 300, and another multifunction peripheral 120 may be connected to the certain multifunction peripheral.

In the following, the functional units of the setting value management service 300 are described. The details of databases stored in the respective functional units are described below with reference to Table 1 to Table 6, and are, therefore, not described here.

The functional units included in the setting value management server 110 are implemented by the CPU 201 of the setting value management server 110 illustrated in FIG. 2 reading and executing a program corresponding to the setting value management service 300 stored in the HDD 204.

A setting value information storage unit 302 stores a setting value information DB 410 (FIG. 4) in the HDD 204.

A setting value information acquisition unit 303 is able to specify a model or version and acquire setting items used for the specified model from the setting value information DB 410, which is stored by the setting value information storage unit 302. Furthermore, the setting value information acquisition unit 303 is able to specify a setting value identifier and acquire metadata set in the specified setting value identifier.

A setting value information updating unit 301 updates the setting value information DB 410, which is stored by the setting value information storage unit 302. Since the setting value information DB 410 contains information about models or versions, for example, in a case where a model to be managed has been added or the version of firmware has been updated, it is necessary to update the setting value information DB 410.

A common setting storage unit 307 stores a common setting DB 411 (FIG. 4) in the HDD 204.

Figure 4:
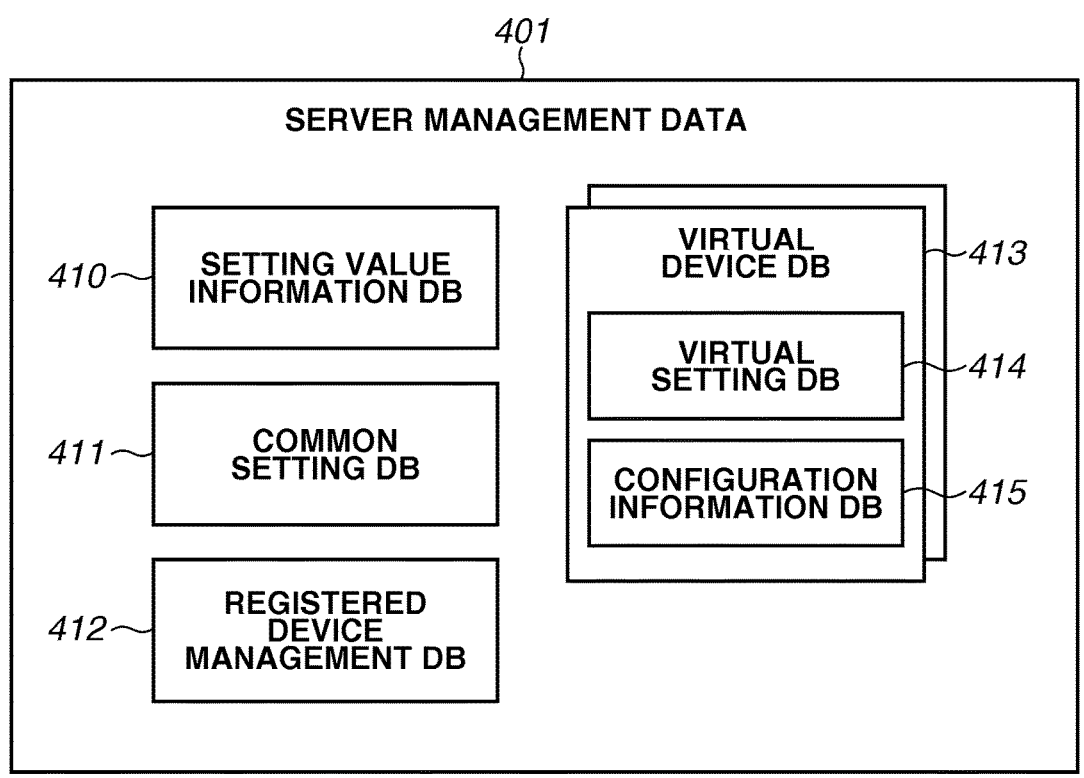
FIG. 4 illustrates a configuration of server management data, which is managed by the setting value management server.

A common setting updating unit 306 specifies a setting value identifier and updates the setting type and value of a setting value in the common setting DB 411, which is stored by the common setting storage unit 307. Furthermore, when updating the setting value, the common setting updating unit 306 updates the last update date and time with the time at which the setting value was updated. Furthermore, at the same time when updating the common setting DB 411, the common setting updating unit 306 requests a virtual setting updating unit 309 to perform setting updating to update setting values with respect to all of the multifunction peripherals managed in a registered device management DB 412 (FIG. 4).

A virtual setting storage unit 308 stores a virtual device DB 413 (FIG. 4) in the HDD 204. A number of virtual device DBs 413 exist corresponding to the number of multifunction peripherals managed by the setting value management server 110. Furthermore, the virtual device DB 413 is composed of a virtual setting DB 414 and a configuration information DB 415, as illustrated in FIG. 4, which is described below.

When accepting a request for setting updating of a virtual device, a virtual setting updating unit 309 updates the virtual device DB 413, which is stored by the virtual setting storage unit 308. The request for setting updating of a virtual device includes a request from a device communication unit 310 having accepted a setting update notification or configuration information update notification from the multifunction peripheral 120, a request from the common setting updating unit 306 having updated the common setting DB 411, and a request from a setting editing unit 311. The virtual setting updating unit 309 updates, according to the content of the accepted request, the virtual setting DB 414 or the configuration information DB 415 included in the corresponding virtual device DB 413.

The device communication unit 310 invokes a device identification unit 305 based on an individual identifier contained in the content of a communication received from the multifunction peripheral 120 and causes the device identification unit 305 to identify a virtual device DB 413 corresponding to the individual identifier. Then, the device communication unit 310 specifies the identified virtual device DB 413, notifies the virtual setting updating unit 309 of the content of the received communication, and requests the virtual setting updating unit 309 to perform updating.

A registered device management information storage unit 304 stores the registered device management DB 412 (FIG. 4) in the HDD 204.

The device identification unit 305 identifies a device by receiving the individual identifier and specifying a device ID from the registered device management DB 412, which is stored by the registered device management information storage unit 304.

The setting editing unit 311 is a unit that updates each setting value DB stored by the setting value management service 300. In the present exemplary embodiment, the setting editing unit 311 selects the common setting DB 411 or the virtual setting DB 414 included in a specific virtual device DB 413. Then, the setting editing unit 311 instructs the common setting updating unit 306 or the virtual setting updating unit 309 to perform editing of a setting value contained in the selected DB.

A setting viewing unit 312 is a unit used to view each setting value DB stored by the setting value management service 300. In the present exemplary embodiment, the setting viewing unit 312 allows the user to select the common setting DB 411 or the virtual setting DB 414 included in a specific virtual device DB 413 and to view setting values contained in the selected DB.

In addition, a virtual policy control unit 313 is described in the third exemplary embodiment, which is described below.

The above-described synchronization processing for the setting values is performed with the network I/F 207 of the setting value management server 110 and the network I/F 225 of the multifunction peripheral 120 communicating with each other via the network 100.

FIG. 4 illustrates an example of a configuration of data managed by the setting value management server 110.

Server management data 401 is composed of management data and setting values about devices. The management data is stored and managed in the setting value information DB 410 and the registered device management DB 412. The setting values about devices are stored and managed in the common setting DB 411 and the virtual device DB 413. As mentioned in the foregoing, the virtual device DB 413 is composed of the virtual setting DB 414 and the configuration information DB 415. The virtual device DB 413 is associated with a multifunction peripheral the setting values of which are managed by the setting value management server 110. Therefore, a number of virtual device DBs 413 exist corresponding to the number of multifunction peripherals the setting values of which are managed by the setting value management server 110.

Table 1 below is a table illustrating data that is stored in the setting value information DB 410.

TABLE 1

Setting Value Information DB Item Table

| Setting Value Identifier | Initial Value | Range | Model/Version |
| --- | --- | --- | --- |
| settings.common.sleep_time | 5 min | 1 min-60 min | common |
| settings.print.density | 5 | 0-10 | model A/ALL, model B/V02.01 or later |
| settings.print.density | 3 | 0-6 | model B/V02.00 or earlier, model C/ALL |
| settings.send.compress_ratio | medium | low, medium, high | common |
| settings.print.tray_position | tray A | A, B, C | common |
| settings.usb_enable | ON | OFF, ON | common |
| settings.auth.auth_mode | OFF | OFF, ON | common |
| settings.auth.personalize | OFF | OFF, ON | common |
| settings.auth.initial_screen | OFF | OFF, ON | common |
| policy.external_device_restrict | OFF | OFF, ON | common |

| Setting Value Identifier | Condition | Policy | Interlocking Specification |
| --- | --- | --- | --- |
| settings.common.sleep_time | — | — | — |
| settings.print.density | — | — | — |
| settings.print.density | — | — | — |
| settings.send.compress_ratio | transmission license | — | — |
| settings.print.tray_position | finisher OPT | — | — |
| settings.usb_enable | — | target | — |
| settings.auth.auth_mode | — | — | present |
| settings.auth.personalize | — | — | interlocked |
| settings.auth.initial_screen | — | — | interlocked |
| policy.external_device_restrict | — | manage | — |

The setting value information DB 410 is a database that stores metadata concerning setting values (metadata about setting values) managed by the setting value management server 110. The setting value information DB 410 stores information on a setting value identifier for identifying a setting value at the time of communication with the multifunction peripheral 120, an initial value, a range, an adaptable model/version, a condition for using the setting value, a policy, and an interlocking specification (management information on setting values).

Furthermore, each setting value managed in the setting value information DB 410 may vary in whether the setting value is present or in the range or initial value of the setting value, depending on the model of the multifunction peripheral 120 or the version of firmware.

For example, in Table 1, a setting value the setting value identifier of which is "settings.common.sleep_time" is indicated to exist at all of the individuals, since the adaptable model/version thereof is "common".

Furthermore, in a setting value the setting value identifier of which is "settings.print.density", as indicated in the adaptable model/version, the model B varies in the range or initial value of the setting value depending on the version (V02.00 or earlier, V02.01 or later) of firmware installed on the model B.

In this way, the setting value management server 110 manages whether to use a setting value in common between a plurality of devices for each setting item of the setting value.

In a setting value for which a condition is set, it is determined whether the condition is satisfied based on the device configuration information.

For example, in Table 1, a setting value the setting value identifier of which is "settings.send.compress_ratio" is indicated to be able to be used only in devices having a "transmission license" as a condition. In the present exemplary embodiment, in a case where the condition is not satisfied, an initial value is set as the setting value. However, a setting value with respect to which the condition is not satisfied may be hidden, may be set as an initial value, or may be removed from the setting items.

Furthermore, the information managed in the setting value information DB 410 also includes information for setting a relationship between a certain setting value and another setting value, such as policy and interlocking specification. The policy is described in detail in the third exemplary embodiment, which is described below, but the interlocking specification is described now.

The setting value for which the interlocking specification is set is a setting value (an original setting value) which, when being changed, causes a change of another setting value in interlocking relation, or a setting value (an interlocked setting value) which is changed in interlocking with a change of another setting value. In other words, the original setting value is a setting value which causes the interlocked setting value to be interlocked with the original setting value, and the interlocked setting value is a setting value which is interlocked with the original setting value. The relationship between the original setting value and the interlocked setting value corresponds to the relationship between an interlocking source and an interlocking destination. A setting value in which the interlocking specification is indicated as "present" serves as the original setting value, and a setting value in which the interlocking specification is indicated as "interlocked" serves as the interlocked setting value.

In this way, the setting value management server 110 manages the interlocking relation between a plurality of setting values that the same device uses. Thus, the setting value management server 110 regulates, among a plurality of setting values, another setting value that is to be changed in interlocking with a change of a certain setting value.

In the example shown in Table 1, in a case where a setting value the setting value identifier of which is "settings.auth.auth_mode" has been changed, another setting value is to be changed in interlocking relation. Furthermore, in a case where another setting value has been changed, a setting value the setting value identifier of which is "settings.auth.personalize" or "settings.auth.initial_screen" is to be changed in interlocking relation. Moreover, the interlocking specification is described with reference to Table 2.

Table 2 below is a table obtained by extracting an interlocking specification portion of the setting value information DB 410.

TABLE 2

Setting Value Interlocking Specification Table

| Original Setting Value Identifier | Value | Interlocked Setting Value Identifier | Interlocking Value | Possibility of Change |
|---|---|---|---|---|
| settings.auth.auth_mode | OFF | settings.auth.initial_screen | OFF | impossible |
|  |  | settings.auth.personalize | OFF | impossible |
|  | ON | settings.auth.initial_screen | ON | possible |
|  |  | settings.auth.personalize | ON | possible |

The interlocking specification is composed of items including an original setting value identifier, a value, an interlocked setting value identifier, an interlocking value, and a possibility of change. In a case where a setting value indicated with the original setting value identifier has been changed, the value to which a setting value with the interlocked setting value identifier is to be changed is determined in interlocking relation based on the changed value of the setting value with the original setting value identifier. In the example shown in Table 2, in a case where a setting value indicated with the setting value identifier "settings.auth.auth_mode" has been changed to a value "OFF", setting values with the interlocked setting value identifiers "settings.auth.initial_screen" and "settings.auth.personalize" are set to an interlocking value "OFF".

The possibility of change represents that, in the case of "impossible", when the original setting value identifier has a value set forth in Table 2, it is impossible to change the value of the interlocked setting value identifier and, in the case of "possible", it is possible to change the value of the interlocked setting value identifier. In the example shown in Table 2, when the value of the original setting value identifier "settings.auth.auth_mode" is "OFF", it is impossible to change the setting values of the interlocked setting value identifiers "settings.auth.initial_screen" and "settings.auth.personalize".

Table 3 below is a table illustrating data that is stored in the common setting DB 411.

TABLE 3

Common Setting DB Item Table

| Setting Value Identifier | Setting Type | Value | Policy Control | Update Time |
|---|---|---|---|---|
| settings.common.sleep_time | common | 1 min | OFF | Apr. 1, 2013 12:05 |
| settings.print.density | individual | — | — | — |
| settings.send.compress_ratio | common | low | OFF | Jun. 21, 2013 12:00 |
| settings.print.tray_position | individual | — | — | — |
| settings.usb_enable | individual | — | — | — |
| settings.auth.auth_mode | common | ON | OFF | Apr. 22, 2013 19:40 |
| settings.auth.personalize | common | ON | OFF | Apr. 22, 2013 19:40 |
| settings.auth.initial_screen | individual | — | — | — |
| policy.external_device_restrict | common | ON | OFF | Apr. 22, 2013 19:49 |

The common setting DB 411 is a database used to manage setting values that are used in common and synchronized with respect to all of a plurality of multifunction peripherals 120 the setting values of which are managed by the setting value management server 110. With respect to each setting value identifier stored in the setting value information DB 410, it can be set whether to manage a setting value in common between devices or whether to manage a setting value individually in devices. The state of such setting is represented by "Setting Type". The setting type "common" indicates that the setting value is managed in common between devices, and the setting type "individual" indicates that the setting value is managed individually in devices.

The common setting DB 411 stores all of the setting value identifiers that are managed in the setting value information DB 410. With respect to each setting value identifier, there are stored a setting type, a corresponding value in the case of the setting type "common", and the date and time of last updating of the setting value. In the case of the setting type "individual", the corresponding value and the date and time of last updating are not stored.

Furthermore, the setting value identifiers stored in the common setting DB 411 are systematized in the same manner as the setting value identifiers managed in the setting value information DB 410.

Table 4 below is a table illustrating data that is stored in the registered device management DB 412.

TABLE 4

Registered Device Management DB Table

| Device ID | Individual Identifier |
|---|---|
| 100001 | A1-AAAA |
| 100002 | A1-AAAB |
| 100003 | B1-AAAA |
| 100004 | B2-AAAA |
| 100005 | C1-AAAA |

The registered device management DB 412 is a database used to manage individual multifunction peripherals 120 the setting values of which are managed by the setting value management server 110. The registered device management DB 412 stores a device ID for uniquely identifying a multifunction peripheral 120 targeted for synchronization and an individual identifier for identifying the individual multifunction peripheral 120.

Table 5 below is a table illustrating data that is stored in the virtual setting DB 414 included in the virtual device DB 413.

TABLE 5

Virtual Setting DB Item Table

| Setting Value Identifier | Value | Policy Control | Update Time |
|---|---|---|---|
| Common Setting Portion | | | |
| settings.common. sleep_time | 1 min | OFF | Apr. 1, 2013 12:05 |
| settings.send. compress_ratio | low | OFF | Jun. 21, 2013 12:00 |
| settings.auth. auth_mode | ON | OFF | Apr. 22, 2013 19:40 |
| settings.auth. personalize | ON | OFF | Apr. 22, 2013 19:40 |
| policy.external_ device_restrict | ON | OFF | Apr. 22, 2013 19:49 |
| Individual Setting Portion | | | |
| settings.print. density | 6 | OFF | Apr. 22, 2013 19:49 |
| settings.print. tray_position | A | OFF | Apr. 22, 2013 19:49 |
| settings.usb_ enable | OFF | ON | Apr. 22, 2013 19:49 |
| settings.auth. initial_screen | OFF | OFF | Apr. 22, 2013 19:49 |

The virtual setting DB 414 is a database used to manage setting values the values of which are different with respect to a plurality of multifunction peripherals that are managed by the setting value management server 110. Furthermore, it is supposed that a number of virtual setting DBs 414 exist corresponding to individual multifunction peripherals, i.e., corresponding to the number of multifunction peripherals that are managed by the setting value management server 110.

The virtual setting DB 414 is composed of a common setting portion, which stores setting value identifiers the setting type of which is "common", and an individual setting portion, which stores setting value identifiers the setting type of which is "individual", in the common setting DB 411.

Each of the common setting portion and the individual setting portion stores a value, policy control, and the date and time of last updating of the setting value, corresponding to each setting value identifier.

Furthermore, the setting value identifiers stored in the virtual setting DB 414 are systematized in the same manner as the setting value identifiers managed in the setting value information DB 410. In addition, the policy control portion is described in the third exemplary embodiment, which is described below.

Table 6 below is a table illustrating the content of device configuration information for each individual multifunction peripheral that is managed in the configuration information DB 415 included in the virtual device DB 413.

TABLE 6

Device Configuration Information DB Item Table

| Attribute | Value |
|---|---|
| individual identifier | A1-FFFF |
| model name | A |
| version | V1.01 |
| license | communication high compression setting value synchronization |
| accessory | finisher 1 optional cassette |
| operating condition | in process of synchronization |

The configuration information DB 415 is a database used to store and manage the device configuration information. The device configuration information includes an individual identifier for identifying an individual multifunction peripheral, a model name, the version of firmware, license information indicating an available function, information on an accessory attached to the multifunction peripheral, and a synchronous operating condition indicating whether the multifunction peripheral is in the process of synchronization or in the process of temporary stop. It is supposed that a number of configuration information DBs 415 exist corresponding to individual multifunction peripherals, i.e., corresponding to the number of multifunction peripherals that are managed by the setting value management server 110.

Furthermore, the model name, the version of firmware, the license information, etc., in the virtual device DB 413 are systematized in the same manner as those managed in the setting value information DB 410.

The setting value management server 110 uses the above-described databases of the server management data 401 to manage setting values that are different with respect to a plurality of multifunction peripherals 120 targeted for management. Furthermore, the setting value management server 110 is also able to collectively manage setting values that are common in all of the multifunction peripherals targeted for management, and metadata of the setting values themselves.

Table 7 below is a table illustrating a configuration of a device setting value DB stored in the HDD 224 by the device setting value storage unit 323 of the multifunction peripheral 120.

TABLE 7

Device Setting Value DB Item Table

| Setting Value Identifier | Value | Policy Control | Update Time | Initial Value |
|---|---|---|---|---|
| settings.common. sleep_time | 1 min | OFF | Apr. 1, 2013 12:05 | 5 min |
| settings.print. density | 6 | OFF | Apr. 22, 2013 19:49 | 5 |
| settings.send. compress_ratio | low | OFF | Jun. 21, 2013 12:00 | medium |
| settings.print. tray_position | A | OFF | Apr. 22, 2013 19:49 | tray A |
| settings.usb_ enable | OFF | ON | Apr. 22, 2013 19:49 | ON |
| settings.auth. auth_mode | ON | OFF | Apr. 22, 2013 19:40 | OFF |
| settings.auth. personalize | ON | OFF | Apr. 22, 2013 19:40 | OFF |
| settings.auth. initial_screen | OFF | OFF | Apr. 22, 2013 19:40 | OFF |
| policy.external_ device_restrict | ON | OFF | Apr. 22, 2013 19:49 | OFF |

TABLE 7-continued

Device Setting Value DB Item Table

| Setting Value Identifier | Range | Condition | Policy | Interlocking Specification |
|---|---|---|---|---|
| settings.common.sleep_time | 1 min-60 min | — | — | — |
| settings.print.density | 0-10 | — | — | — |
| settings.send.compress_ratio | low, medium, high | transmission license | — | — |
| settings.print.tray_position | A, B, C | finisher OPT | — | — |
| settings.usb_enable | OFF, ON | — | target | — |
| settings.auth.auth_mode | OFF, ON | — | — | present |
| settings.auth.personalize | OFF, ON | — | — | interlocked |
| settings.auth.initial_screen | OFF, ON | — | — | interlocked |
| policy.external_device_restrict | OFF, ON | — | manage | — |

The device setting value DB is a database that stores setting values to be used for the multifunction peripheral 120. The setting values stored in the device setting value DB are composed of elements including a setting value identifier for identifying a setting value, a value of the setting value, policy control, update time, an initial value, a range, a condition, a policy, and an interlocking specification. These elements are managed and systematized in the same manner as those managed in the virtual setting DB 414. Thus, information such as that shown in Table 2 is also stored in the interlocking specification shown in Table 7.

In a case where a setting value has been changed in the setting value management server 110 or the multifunction peripheral 120, at least the setting value identifier and the value among the data elements shown in Table 7 are communicated to synchronize the setting value between the setting value management server 110 and the multifunction peripheral 120.

The data shown in the above-described tables is merely an example, and aspects of the present invention are not limited to that data.

In the following, processing performed in a case where a setting value has been changed in the setting value management server 110 or the multifunction peripheral 120 is described.

FIG. 5A is a flowchart illustrating an example of processing performed in a case where a setting value has been changed in the multifunction peripheral 120 in the first exemplary embodiment. The steps in the flowchart of FIG. 5A are implemented by the CPU 221 included in the multifunction peripheral 120 loading a program stored in a memory, such as the ROM 222, onto the RAM 223 and executing the program. Furthermore, the flowchart of FIG. 5A illustrates processing performed from the time when the device setting value management unit 322 accepts a change of the setting value to the time when the device setting value management unit 322 and registers the change of the setting value with the device setting value DB and notifies the setting value management server 110 of the change of the setting value. Moreover, in the flowchart of FIG. 5A, the processing starts at the time when the device setting value management unit 322 accepts a change of the setting value.

In step S501, the device setting value management unit 322 accepts a change request for a setting value, reads the content of the change request, and then advances the processing to step S502.

In step S502, the device setting value management unit 322 acquires, from the device setting value storage unit 323, setting value information concerning the setting value for which the change request has been accepted in step S501, and then advances the processing to step S503.

In step S503, the device setting value management unit 322 registers a change of the setting value subjected to the change request with the device setting value DB via the device setting value storage unit 323. Upon completion of the registration, the device setting value management unit 322 advances the processing to step S504.

In step S504, the device setting value management unit 322 determines whether there is a setting to be interlocked with the setting value for which the change request has been accepted in step S501, based on the setting value information acquired in step S502.

If it is determined that there is no setting to be interlocked with the changed setting value (NO in step S504), the device setting value management unit 322 directly advances the processing to step S506.

On the other hand, if, in step S504, it is determined that there is a setting to be interlocked with the changed setting value (YES in step S504), the device setting value management unit 322 advances the processing to step S505.

In step S505, the device setting value management unit 322 registers, with the device setting value DB via the device setting value storage unit 323, a change of a setting value, which is changed in interlocking with the change of the setting value for which the change request has been accepted in step S501. Upon completion of the registration, the device setting value management unit 322 advances the processing to step S506.

In step S506, the device setting value management unit 322 requests the device setting value communication unit 321 to notify the setting value management server 110 of the setting value identifier and the value of the setting value that has been changed according to the processing in the flowchart of FIG. 5A. In response to the request from the device setting value management unit 322, the device setting value communication unit 321 acquires an individual identifier of the multifunction peripheral 120 from the synchronization control unit 324, notifies the setting value management server 110 of a setting value change content, which is composed of information of the changed setting value and includes the acquired individual identifier and the setting value identifier and the value of the setting value for which the change request has been accepted, and then advances the processing to step S507.

In step S507, the device setting value management unit 322 instructs the device setting value storage unit 323 to update the DB by fixing the changes of the setting values registered with the device setting value DB in steps S503 and S505. Upon completion of updating of the DB, the setting value management server 110 ends the processing in the flowchart of FIG. 5A.

FIG. 5B is a flowchart illustrating an example of processing performed by the setting value management server 110 when receiving, from the multifunction peripheral 120, a notification of the setting value change content in the first exemplary embodiment. The steps in the flowchart of FIG. 5B are implemented by the CPU 201 included in the setting value management server 110 loading a program stored in a memory, such as the ROM 202, onto the RAM 203 and executing the program. Furthermore, the flowchart of FIG. 5B illustrates processing performed from the time when the device communication unit 310 receives a communication from the multifunction peripheral 120 to the time when the virtual setting updating unit 309 updates a virtual device setting. Moreover, in the flowchart of FIG. 5B, the processing starts at the time when the device communication unit 310 receives a communication from the multifunction peripheral 120.

In step S511, the device communication unit 310 receives a notification of the setting value change content from the multifunction peripheral 120, extracts the individual identifier, the setting value identifier, and the value from the received setting value change content, and then advances the processing to step S512.

In step S512, the device communication unit 310 notifies the device identification unit 305 of the individual identifier extracted in step S511 to determine whether the individual identifier extracted in step S511 is present in the registered device management DB 412. If it is determined that the individual identifier is present in the registered device management DB 412, the device communication unit 310 specifies a target virtual device DB 413 based on the individual identifier. Then, the device communication unit 310 notifies the virtual setting updating unit 309 of the virtual device DB 413 being specified and the setting value identifier and the value extracted in step S511, thus requesting the virtual setting updating unit 309 to change the setting value, and then advances the processing to step S513.

In step S513, the virtual setting updating unit 309 performs virtual setting update processing, which targets the specified virtual device DB 413, based on the setting value identifier and the value of which the virtual setting updating unit 309 has been notified. The details of the virtual setting update processing are described below with reference to FIG. 7A. Upon completion of the virtual setting update processing, the setting value management server 110 ends the processing in the flowchart of FIG. 5B.

Figure 6:
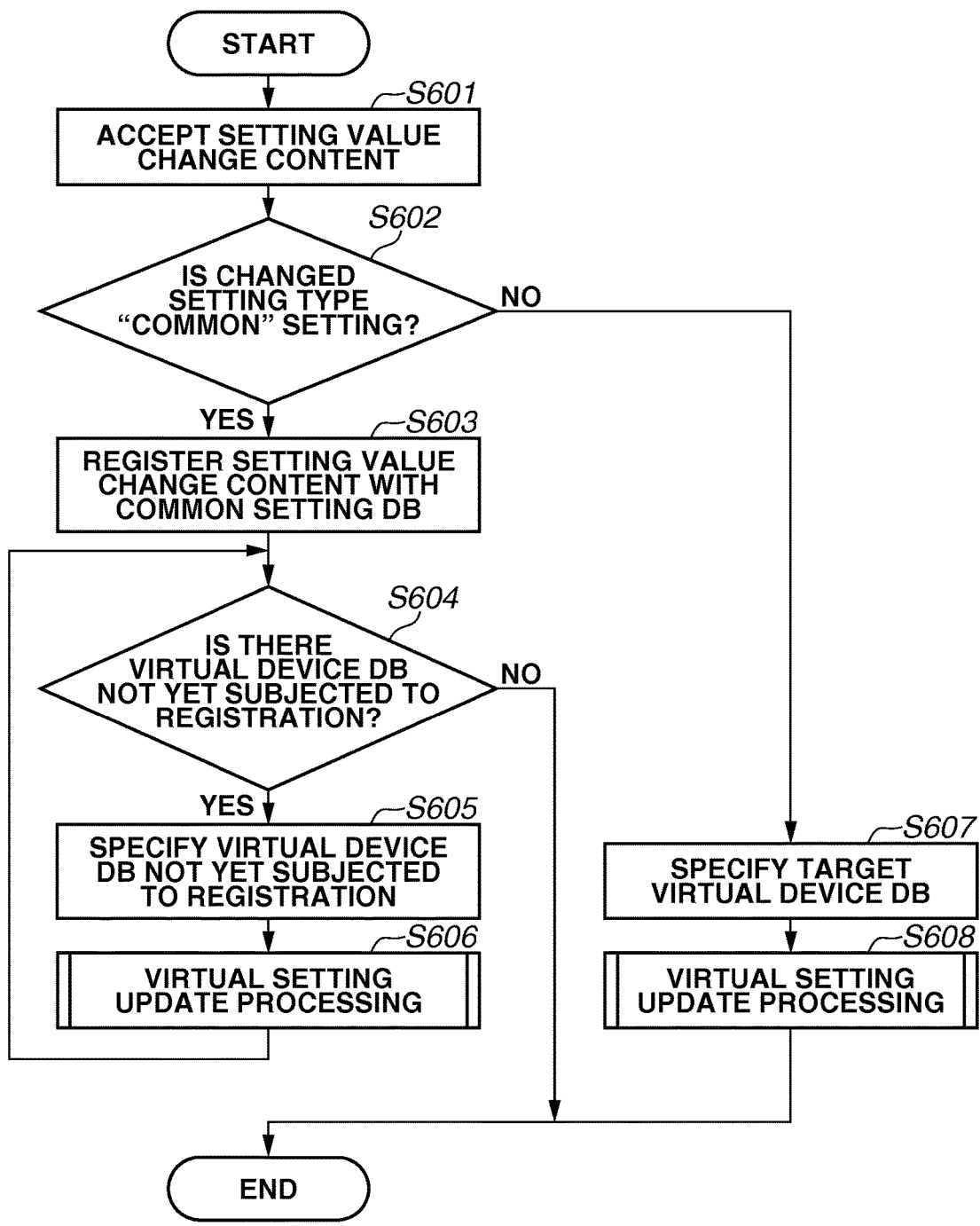
FIG. 6 is a flowchart illustrating setting value change processing performed by the setting value management server according to the first exemplary embodiment.

FIG. 6 is a flowchart illustrating an example of processing performed when the setting value management server 110 has accepted setting editing processing in the first exemplary embodiment. The steps in the flowchart of FIG. 6 are implemented by the CPU 201 included in the setting value management server 110 loading a program stored in a memory, such as the ROM 202, onto the RAM 203 and executing the program. Furthermore, the flowchart of FIG. 6 illustrates processing performed from the time when the setting editing unit 311 accepts editing of a setting value to the time when the setting editing unit 311 registers the content of the accepted editing with the server management data 401. Moreover, in the flowchart of FIG. 6, the processing starts at the time when the setting editing unit 311 accepts a setting value editing request.

In step S601, the setting editing unit 311 accepts, as a setting value change content, the setting value identifier and the value of a setting value that has been changed by editing, and then advances the processing to step S602.

In step S602, the setting editing unit 311 determines, by checking with the common setting storage unit 307, whether the setting type of the changed setting value accepted in step S601 is "common" setting or "individual" setting.

If it is determined that the setting type of the changed setting value is "common" setting (YES in step S602), the setting editing unit 311 advances the processing to step S603.

In step S603, the setting editing unit 311 notifies the common setting updating unit 306 of the setting value identifier and the value of the changed setting value. The common setting updating unit 306 registers the setting value change content, of which the common setting updating unit 306 has been notified, with the common setting DB 411 via the common setting storage unit 307, and then advances the processing to step S604.

In step S604, the common setting updating unit 306 acquires, from the registered device management information storage unit 304 via the device identification unit 305, a list of virtual device DBs 413 that are managed by the setting value management server 110, and determines whether there is a virtual device DB 413 with which the setting value change content accepted in step S601 is not yet registered.

If it is determined that there is a virtual device DB 413 with which the setting value change content is not yet registered (YES in step S604), the common setting updating unit 306 advances the processing to step S605.

In step S605, the common setting updating unit 306 specifies, as a target virtual device DB 413, one virtual device DB 413 with which the setting value change content is not yet registered, from among the list of virtual device DBs 413 acquired in step S604. Then, the common setting updating unit 306 notifies the virtual setting updating unit 309 of the target virtual device DB 413 being specified and the setting value identifier and the value of the setting value change content accepted in step S601, and then advances the processing to step S606.

In step S606, the virtual setting updating unit 309 performs virtual setting update processing, which targets the specified virtual device DB 413, based on the setting value identifier and the value of which the virtual setting updating unit 309 has been notified. The details of the virtual setting update processing are described below with reference to FIG. 7A. Upon completion of the virtual setting update processing, the virtual setting updating unit 309 returns the processing to step S604.

Then, if, in step S604, it is determined that there is no virtual device DB 413 with which the setting value change content is not yet registered (NO in step S604), the common setting updating unit 306 ends the processing in the flowchart of FIG. 6.

Furthermore, if, in step S602, it is determined that the setting type of the changed setting value accepted in step S601 is "individual" setting (NO in step S602), the setting editing unit 311 advances the processing to step S607.

In step S607, the setting editing unit 311 inquires of the device identification unit 305 about which virtual device DB 413 is to be changed according to the changed setting value accepted in step S601, thus specifying a target virtual device DB 413. Then, the setting editing unit 311 notifies the virtual setting updating unit 309 of the target virtual device DB 413 being specified and the setting value identifier and the value of the setting value change content accepted in step S601, and then advances the processing to step S608.

In step S608, the virtual setting updating unit 309 performs virtual setting update processing, which targets the specified virtual device DB 413, based on the setting value identifier and the value of which the virtual setting updating unit 309 has been notified. The details of the virtual setting update processing are described below with reference to FIG. 7A. Upon completion of the virtual setting update processing, the setting value management server 110 ends the processing in the flowchart of FIG. 6.

Figure 7A:
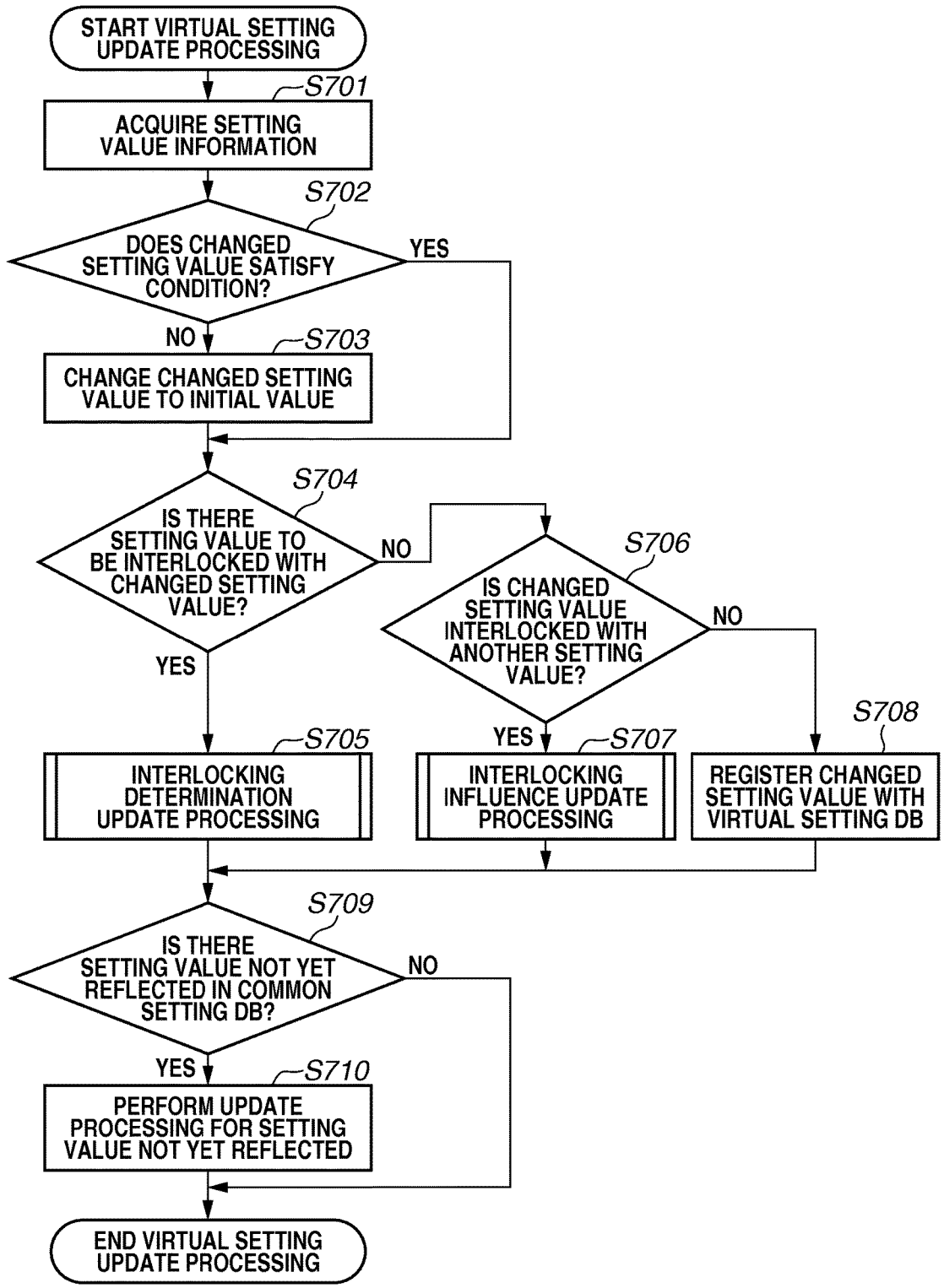
FIG. 7A is a flowchart illustrating virtual setting update processing according to the first exemplary embodiment.

FIG. 7A is a flowchart illustrating an example of the virtual setting update processing, which is performed by the virtual setting updating unit 309 accepting the setting value identifier and the value of the setting value change content to be updated, in the first exemplary embodiment. The steps in the flowchart of FIG. 7A are implemented by the CPU 201 included in the setting value management server 110 loading a program stored in a memory, such as the ROM 202, onto the RAM 203 and executing the program. Furthermore, the flowchart of FIG. 7A illustrates processing performed from the time when the virtual setting updating unit 309 accepts a setting update request to the time when the virtual setting updating unit 309 updates the virtual device DB 413. Moreover, in the flowchart of FIG. 7A, the processing starts at the time when the virtual setting updating unit 309 accepts the setting value identifier and the value of the setting value change content.

In step S701, the virtual setting updating unit 309 acquires, from the setting value information acquisition unit 303, metadata associated with the setting value identifier accepted via the device communication unit 310, the common setting updating unit 306, or the setting editing unit 311, and then advances the processing to step S702.

In step S702, the virtual setting updating unit 309 acquires device configuration information of the corresponding multifunction peripheral from the configuration information DB 415 of the target virtual device DB 413 via the virtual setting storage unit 308, and determines whether the acquired device configuration information and the changed value of the setting value satisfy a condition of the metadata acquired in step S701. In the present exemplary embodiment, it is determined that the condition is satisfied if the device configuration information satisfies the "condition" and "model/version" of the above-mentioned metadata and the changed value of the setting value satisfies the "range".

If, in step S702, it is determined that the device configuration information and the changed value of the setting value do not satisfy the condition of the metadata acquired in step S701 (NO in step S702), the virtual setting updating unit 309 advances the processing to step S703. In step S703, the virtual setting updating unit 309 changes the accepted changed value of the setting value to an initial value, and then advances the processing to step S704.

On the other hand, if, in step S702, it is determined that the device configuration information and the changed value of the setting value satisfy the condition of the metadata acquired in step S701 (YES in step S702), the virtual setting updating unit 309 directly advances the processing to step S704.

In step S704, the virtual setting updating unit 309 determines whether there is a setting value to be interlocked with the accepted changed setting value (in other words, whether the accepted changed setting value is an original setting value of the interlocking specification), based on the metadata acquired in step S701.

If it is determined that there is a setting value to be interlocked with the accepted changed setting value (YES in step S704), the virtual setting updating unit 309 advances the processing to step S705.

In step S705, the virtual setting updating unit 309 performs interlocking determination update processing. The details of the interlocking determination update processing are described below with reference to FIG. 7B. Then, upon completion of the interlocking determination update processing, the virtual setting updating unit 309 advances the processing to step S709.

On the other hand, if, in step S704, it is determined that there is no setting value to be interlocked with the accepted changed setting value (NO in step S704), the virtual setting updating unit 309 advances the processing to step S706.

In step S706, the virtual setting updating unit 309 determines whether the accepted changed setting value is interlocked with another setting value (in other words, whether the accepted changed setting value is an interlocked setting value of the interlocking specification), based on the metadata acquired in step S701.

If it is determined that the accepted changed setting value is interlocked with another setting value (YES in step S706), the virtual setting updating unit 309 advances the processing to step S707.

In step S707, the virtual setting updating unit 309 performs interlocking influence update processing. The details of the interlocking influence update processing are described below with reference to FIG. 7C. Then, upon completion of the interlocking influence update processing, the virtual setting updating unit 309 advances the processing to step S709.

On the other hand, if, in step S706, it is determined that the accepted changed setting value is not interlocked with another setting value (NO in step S706), the virtual setting updating unit 309 advances the processing to step S708.

In step S708, the virtual setting updating unit 309 updates the virtual setting DB 414 of the target virtual device DB 413 with the accepted changed setting value using the virtual setting storage unit 308. Then, upon completion of updating of the virtual setting DB 414, the virtual setting updating unit 309 advances the processing to step S709.

In step S709, the virtual setting updating unit 309 determines whether there is a setting value not yet reflected in the common setting DB 411 among the setting values updated by the processing in the flowchart of FIG. 7A except the setting value changed to an initial value in step S703.

If it is determined that there is a setting value not yet reflected (YES in step S709), the virtual setting updating unit 309 advances the processing to step S710. In step S710, the virtual setting updating unit 309 notifies the common setting updating unit 306 of the setting value identifier and the value of the setting value not yet reflected, determined in step S709, to perform update processing for the setting value not yet reflected. Then, upon completion of update processing of all of the setting values not yet reflected, the virtual setting updating unit 309 ends the processing in the flowchart of FIG. 7A.

On the other hand, if, in step S709, it is determined that there is no setting value not yet reflected (NO in step S709), the virtual setting updating unit 309 ends the processing in the flowchart of FIG. 7A.

FIG. 7B is a flowchart illustrating an example of the interlocking determination update processing, which is performed by the virtual setting updating unit 309 in the setting value management server 110, in the first exemplary embodiment. The steps in the flowchart of FIG. 7B are implemented by the CPU 201 included in the setting value management server 110 loading a program stored in a memory, such as the ROM 202, onto the RAM 203 and executing the program. Furthermore, the flowchart of FIG. 7B illustrates processing performed from the time when the virtual setting updating unit 309 starts the interlocking determination update processing to the time when the virtual setting updating unit 309 registers the interlocked setting value. Moreover, in the flowchart of FIG. 7B, the processing starts at the time when the virtual setting updating unit 309 performs the interlocking determination update processing.

In step S711, the virtual setting updating unit 309 acquires, from the setting value information acquisition unit 303, metadata of each setting value that is to be changed in interlocking with the changed setting value accepted in step S701 illustrated in FIG. 7A, and acquires virtual device configuration information from the configuration information DB 415 of the target virtual device DB 413 via the virtual setting storage unit 308. Then, the virtual setting updating unit 309 determines whether the acquired device configuration information and the changed value of each setting value that is to be changed in interlocking with the changed setting value satisfy a condition of the acquired metadata of each setting value that is to be changed in interlocking with the changed setting value. In the present exemplary embodiment, it is determined that the condition is satisfied if the device configuration information satisfies the "condition" and "model/version" of the above-mentioned each metadata and the changed value of each setting value that is to be changed in interlocking with the changed setting value satisfies the "range".

If, in step S711, it is determined that there is a setting value that does not satisfy the condition (NO in step S711), the virtual setting updating unit 309 advances the processing to step S712.

In step S712, the virtual setting updating unit 309 temporarily changes the value of the interlocked setting value (interlocked value) determined in step S711 not to satisfy the condition to an initial value, and then advances the processing to step S713.

On the other hand, if, in step S711, it is determined that all of the setting values satisfy the condition (YES in step S711), the virtual setting updating unit 309 advances the processing to step S713.

In step S713, the virtual setting updating unit 309 determines whether the accepted updated setting value and the setting values interlocked with that setting value are all of the same setting type.

If it is determined that they are all of the same setting type (YES in step S713), the virtual setting updating unit 309 advances the processing to step S714.

In step S714, the virtual setting updating unit 309 registers the value of the accepted updated setting value and the values of the setting values interlocked with that setting value with the target virtual device DB 413 via the virtual setting storage unit 308, and then ends the processing in the flowchart of FIG. 7B. In a case where the setting types of the interlocked setting values (the original setting value and the interlocked setting values) are all the same, the interlocked setting values are changed based on (preferentially with reference to) the interlocking specification, so that the setting values can be updated while the target virtual device DB 413 is kept in a matched state.

On the other hand, if, in step S713, it is determined that there is a setting value of a different setting type among the accepted updated setting value and the setting values interlocked with that setting value (NO in step S713), the virtual setting updating unit 309 advances the processing to step S715.

In step S715, the virtual setting updating unit 309 determines whether the setting type of the accepted updated setting value is "common".

If it is determined that the setting type of the accepted updated setting value is "common" (YES in step S715), the virtual setting updating unit 309 advances the processing to step S714. The case where a result of the determination in step S715 is YES corresponds to a case where the setting type of the original setting value of the interlocking specification is "common" and a setting value of the setting type "individual" is included in the interlocked setting values of the interlocking specification. In this case, the interlocked setting values are changed based on (preferentially with reference to) the interlocking specification, so that the setting values can be updated while the target virtual device DB 413 is kept in a matched state.

On the other hand, if it is determined that the setting type of the accepted updated setting value is "individual" (NO in step S715), the virtual setting updating unit 309 advances the processing to step S716.

In step S716, the virtual setting updating unit 309 determines, using the metadata acquired in step S701 illustrated in FIG. 7A, whether, in a case where the accepted updated setting value and all of the setting values interlocked with that setting value are updated, the updated setting values become mismatched in the target virtual device DB 413.

If it is determined that the updated setting values do not become mismatched in the target virtual device DB 413 (NO in step S716), the virtual setting updating unit 309 advances the processing to step S717.

In step S717, the virtual setting updating unit 309 registers, with the target virtual device DB 413 via the virtual setting storage unit 308, the value of the accepted updated setting value and the value of a setting value of the setting type "individual" among the setting values interlocked with the accepted updated setting value, and then ends the processing in the flowchart of FIG. 7B. The case where a result of the determination in step S716 is YES corresponds to a case where the setting type of the original setting value of the interlocking specification is "individual", a setting value of the setting type "common" is included in the interlocked setting values of the interlocking specification, and the updated setting values do not become mismatched in the target virtual device DB 413. In this case, if the interlocked setting value of the setting type "common" is changed in interlocking with the original setting value of the setting type "individual", the updated setting values may become mismatched in another virtual device DB 413. Therefore, in step S717, only the setting values of the setting type "individual" among the interlocked setting values of the interlocking specification are changed, so that the setting values can be updated while the virtual device DB 413 is in a matched state. Furthermore, in this case, information on the setting values of the setting type "common", which are not registered in interlocking with the updated setting values, may be notified to a user or administrator who has issued an instruction for editing the setting values via the setting editing unit 311.

On the other hand, if, in step S716, it is determined that the updated setting values become mismatched in the target virtual device DB 413 (YES in step S716), the virtual setting updating unit 309 advances the processing to step S718.

In step S718, the virtual setting updating unit 309 cancels the accepted updated setting value without updating in the target virtual device DB 413, and then ends the processing in the flowchart of FIG. 7B. The case where a result of the determination in step S716 is NO corresponds to a case where the setting type of the original setting value of the interlocking specification is "individual", a setting value of the setting type "common" is included in the interlocked setting values of the interlocking specification, and the updated setting values become mismatched in the target virtual device DB 413. Therefore, in this case, the setting values are not registered with the target virtual device DB 413, so that the occurrence of a mismatched state in the virtual device DB 413 can be prevented. Furthermore, at the time of canceling the accepted updated setting value, that effect may be notified to a user or administrator who has issued an instruction for editing the setting values via the setting editing unit 311.

FIG. 7C is a flowchart illustrating an example of the interlocking influence update processing performed by the virtual setting updating unit 309 of the setting value management server 110 in the first exemplary embodiment. The steps in the flowchart of FIG. 7C are implemented by the CPU 201 included in the setting value management server 110 loading a program stored in a memory, such as the ROM 202, onto the RAM 203 and executing the program. Furthermore, the flowchart of FIG. 7C illustrates processing performed from the time when the virtual setting updating unit 309 starts the interlocking influence update processing to the time when the virtual setting updating unit 309 registers the accepted updated setting value. Moreover, in the flowchart of FIG. 7C, the processing starts at the time when the virtual setting updating unit 309 performs the interlocking influence update processing.

In step S721, the virtual setting updating unit 309 determines, based on the metadata acquired in step S701 illustrated in FIG. 7A, whether, in a case where the changed setting value accepted in step S701 illustrated in FIG. 7A is updated, the updated setting values become mismatched in the target virtual device DB 413.

If it is determined that the updated setting values do not become mismatched in the target virtual device DB 413 (NO in step S721), the virtual setting updating unit 309 advances the processing to step S722.

In step S722, the virtual setting updating unit 309 registers the accepted updated setting values with the virtual setting DB 414 of the target virtual device DB 413 via the virtual setting storage unit 308, and then ends the processing in the flowchart of FIG. 7C.

On the other hand, if, in step S721, it is determined that the updated setting values become mismatched in the target virtual device DB 413 (YES in step S721), the virtual setting updating unit 309 advances the processing to step S723.

In step S723, the virtual setting updating unit 309 determines whether the setting type of the accepted updated setting value is "individual".

If it is determined that the setting type of the accepted updated setting value is "common" (NO in step S723), the virtual setting updating unit 309 advances the processing to step S724.

In step S724, the virtual setting updating unit 309 determines whether a setting value of the setting type "common" is included in other setting values used to change the accepted updated setting value by the interlocking specification (the original setting values of the interlocking specification).

If all of the setting types of the original setting values of the interlocking specification are "individual" (NO in step S724), the virtual setting updating unit 309 advances the processing to step S725.

In step S725, the virtual setting updating unit 309 does not update the target virtual device DB 413 with the values of the accepted updated setting values, but sets a result of the processing as "successful in updating" and then ends the processing in the flowchart of FIG. 7C.

On the other hand, if, in step S724, it is determined that a setting value of the setting type "common" is included in the original setting values of the interlocking specification (YES in step S724), the virtual setting updating unit 309 advances the processing to step S726.

Furthermore, if, in step S723, it is determined that the setting type of the accepted updated setting value is "individual" (YES in step S723), the virtual setting updating unit 309 also advances the processing to step S726.

In step S726, the virtual setting updating unit 309 cancels the content of the changed setting value without updating the target virtual device DB 413 with the value of the accepted updated setting value, and then ends the processing in the flowchart of FIG. 7C. Furthermore, at the time of canceling the content of the changed setting value, that effect may be notified to an administrator.

Moreover, in a case where the virtual setting update processing illustrated in FIG. 7A is invoked from step S606 illustrated in FIG. 6, if a result of the processing is set as "successful in updating" in step S725, the virtual setting updating unit 309 continues a loop of steps S604 to S606 until there becomes no virtual device DB not yet subjected to registration. On the other hand, if the content of the changed setting value is canceled in step S726, the virtual setting updating unit 309 exits the loop of steps S604 to S606 at that point of time, and then ends the processing.

In this way, setting values of a device B can be prevented from becoming mismatched due to a setting value of a device A being changed.

For example, a case where a first setting value and a second setting value are included in a plurality of setting values that the device A uses is described. The first setting value is a setting value serving as an interlocking source, and the second setting value is a setting value serving as an interlocking destination. In other words, when the first setting value is changed, the second setting value is also changed according to the change of the first setting value. On the other hand, even if the second setting value is changed, the first setting value is not changed accordingly.

Here, in a case where the first setting value is a setting value of the setting type "individual" (a setting value which is not used in common with another device) and the second setting value is a setting value of the setting type "common", if the first setting value that the device A uses is changed, mismatching of setting values may occur in the device B.

The first setting value is, for example, ON/OFF for authentication mode. In addition, the second setting value is, for example, ON/OFF for login screen display. When the authentication mode is ON, there is matching even if the login screen display is ON or OFF. Furthermore, when the authentication mode is OFF, there is matching if the login screen display is also OFF. However, when the authentication mode is OFF, if the login screen display is ON, mismatching occurs.

The following describes an example of a case where, in the devices A and B, in a state in which the authentication mode is OFF and the login screen display OFF, a change instruction has been received to change the authentication mode from OFF to ON.

First, the first setting value that the device A uses is changed (for example, the authentication mode is changed from OFF to ON). Next, the second setting value that the device A uses is changed in interlocking with the first setting value (for example, the login screen display is changed from OFF to ON). Next, the changed second setting value (ON of the login screen display of the device A) is used to synchronize the second setting value of the device B (ON of the login screen display of the device B).

At this time, since the first setting value of the device B is still unchanged (OFF of the authentication mode), mismatching between the setting values may occur in the device B (OFF of the authentication mode and ON of the login screen display).

Therefore, in such a case, the setting value management server 110 according to the present exemplary embodiment cancels the change instruction. In this way, mismatching can be prevented from occurring between a plurality of setting values that the device B uses.

As described above, according to the first exemplary embodiment, the user can update setting values of a multifunction peripheral while maintaining matching of the setting values without regard for the place of change of a setting value (each multifunction peripheral or a setting value management server) or a setting type set for the setting value ("common" or "individual").

According to the above-described first exemplary embodiment, while the management of setting values of an information processing apparatus is unified by a management apparatus, a setting value is allowed to be changed in both the information processing apparatus and the management apparatus, and the occurrence of a state in which the setting values become mismatched can be prevented.

In the above-described first exemplary embodiment, an example has been described in which even when a setting value is updated in either the multifunction peripheral 120 or the setting value management server 110, a device setting can be updated while maintaining matching of the setting values. Furthermore, besides directly updating a setting value, there is a case of updating a device setting. For example, there is a case where device configuration of a multifunction peripheral is changed. Accordingly, in a second exemplary embodiment described below, a configuration of updating a device setting without causing mismatching even when the device configuration of a multifunction peripheral is changed is described. In the second exemplary embodiment, the same portions as those of the first exemplary embodiment are omitted from description, and only different portions are described.

Figure 8A:
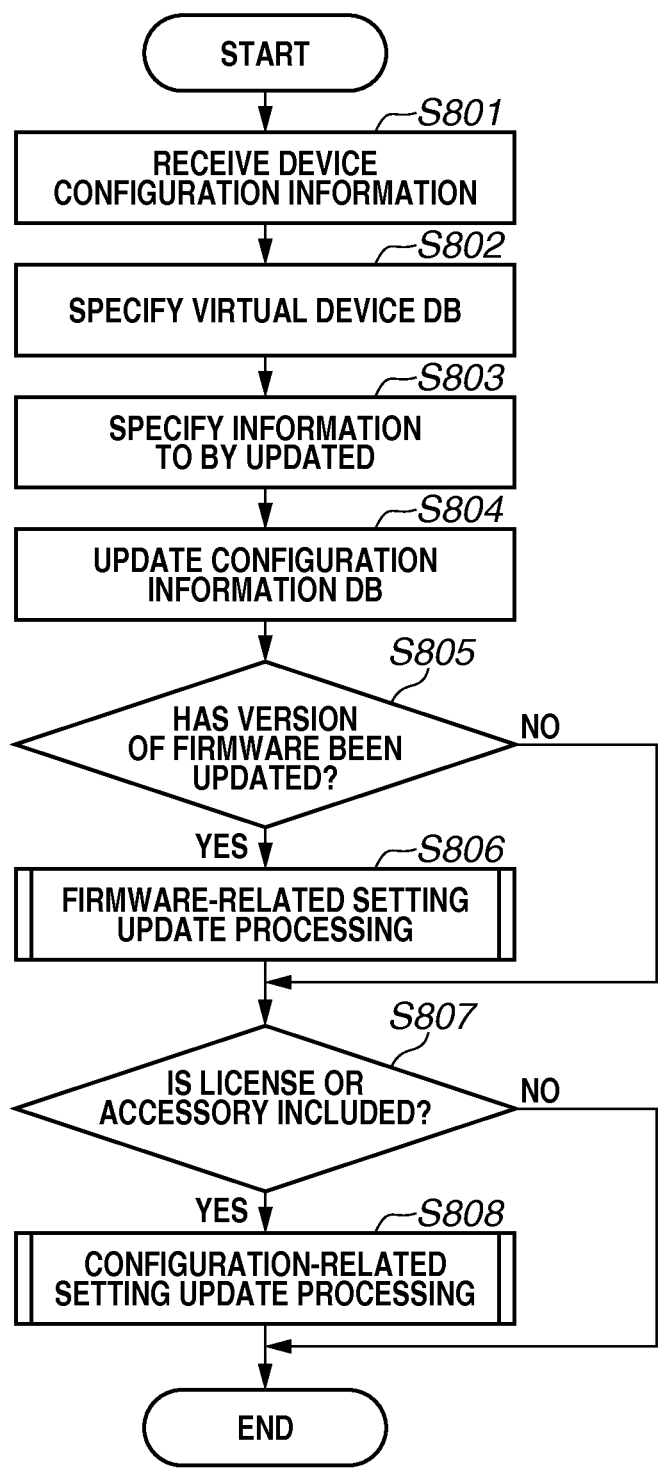
FIG. 8A is a flowchart illustrating device configuration information change processing according to a second exemplary embodiment.

FIG. 8A is a flowchart illustrating an example of processing performed when the setting value management server 110 has received a notification of updating of device configuration information from the multifunction peripheral 120 in the second exemplary embodiment. The steps in the flowchart of FIG. 8A are implemented by the CPU 201 included in the setting value management server 110 loading a program stored in a memory, such as the ROM 202, onto the RAM 203 and executing the program. Moreover, in the flowchart of FIG. 8A, the processing starts at the time when the setting value management server 110 has received a communication from the multifunction peripheral 120.

In step S801, the device communication unit 310 receives an updating notification of device configuration information from the multifunction peripheral 120, reads out an individual identifier included in the received updating notification and the attribute and value of the device configuration information, and then advances the processing to step S802.

In step S802, the device communication unit 310 specifies, via the device identification unit 305, a virtual device DB 413 corresponding to the individual identifier read out in step S801. Then, the device communication unit 310 notifies the virtual setting updating unit 309 of the attribute and value of the device configuration information read out from the updating notification, requests the virtual setting updating unit 309 to update device configuration information targeting the specified virtual device DB 413, and then advances the processing to step S803.

In step S803, the virtual setting updating unit 309 reads out, via the virtual setting storage unit 308, device configuration information from the configuration information DB 415 contained in the target virtual device DB 413, specifies the attribute and value of device configuration information to be updated, based on the attribute and value of the device configuration information of which the virtual setting updating unit 309 has been notified, and then advances the processing to step S804.

In step S804, the virtual setting updating unit 309 updates, via the virtual setting storage unit 308, the configuration information DB 415 of the target virtual device DB 413 with the device configuration information to be updated specified in step S803, and then advances the processing to step S805.

In step S805, the virtual setting updating unit 309 determines whether the version of firmware is included in the attribute of the device configuration information updated in step S804.

If it is determined that the version of firmware is not included (NO in step S805), the virtual setting updating unit 309 directly advances the processing to step S807.

On the other hand, if, in step S805, it is determined that the version of firmware is included (YES in step S805), the virtual setting updating unit 309 advances the processing to step S806.

In step S806, the virtual setting updating unit 309 performs firmware-related setting update processing. The details of the firmware-related setting update processing are described below with reference to FIG. 8B. Upon completion of the firmware-related setting update processing, the virtual setting updating unit 309 advances the processing to step S807.

In step S807, the virtual setting updating unit 309 determines whether a license or an accessory is included in the attribute of the device configuration information updated in step S804.

If it is determined that neither a license nor an accessory is included (NO in step S807), the virtual setting updating unit 309 directly ends the processing in the flowchart of FIG. 8A.

On the other hand, if, in step S807, it is determined that a license or an accessory is included (YES in step S807), the virtual setting updating unit 309 advances the processing to step S808. In step S808, the virtual setting updating unit 309 performs configuration-related setting update processing. The details of the configuration-related setting update processing are described below with reference to FIG. 8C. Upon completion of the configuration-related setting update processing, the virtual setting updating unit 309 ends the processing in the flowchart of FIG. 8A.

FIG. 8B is a flowchart illustrating an example of the firmware-related setting update processing performed in step S806 illustrated in FIG. 8A. The steps in the flowchart of FIG. 8B are implemented by the CPU 201 included in the setting value management server 110 loading a program stored in a memory, such as the ROM 202, onto the RAM 203 and executing the program. Furthermore, the flowchart of FIG. 8B illustrates processing performed from the time when the virtual setting updating unit 309 starts the firmware-related setting update processing to the time when the virtual setting updating unit 309 registers the influenced setting value. Moreover, in the flowchart of FIG. 8B, the processing starts at the time when the virtual setting updating unit 309 performs the firmware-related setting update processing.

In step S811, the virtual setting updating unit 309 specifies, via the setting value information acquisition unit 303, all of the setting value identifiers of setting values that are influenced by updating of the version attribute value of firmware performed in step S804 illustrated in FIG. 8A, records all of the specified setting value identifiers into the RAM 203, and then advances the processing to step S812.

In step S812, the virtual setting updating unit 309 determines whether there is a setting value identifier that is not yet subjected to updating determination among the setting value identifiers specified in step S811. If it is determined that there is a setting value identifier that is not yet subjected to updating determination (YES in step S812), the virtual setting updating unit 309 advances the processing to step S813.

In step S813, the virtual setting updating unit 309 selects one setting value identifier that is not yet subjected to updating determination from among the setting value identifiers specified in step S811, and then advances the processing to step S814.

In step S814, the virtual setting updating unit 309 determines whether the setting type of the setting value identifier selected in step S813 is "common", and then changes the selected setting value identifier to a setting value identifier already subjected to updating determination. If it is determined that the setting type is "common" (YES in step S814), the virtual setting updating unit 309 advances the processing to step S815.

In step S815, the virtual setting updating unit 309 reads out, from the common setting storage unit 307, the value of a setting value corresponding to the setting value identifier selected in step S813. Furthermore, the virtual setting updating unit 309 acquires metadata of the selected setting value identifier from the setting value information acquisition unit 303. Then, the virtual setting updating unit 309 converts the read-out common setting value into a value to be registered with the target virtual device DB 413, according to information on the model/version of the metadata, and then advances the processing to step S816.

In step S816, the virtual setting updating unit 309 registers the value converted in step S815 with the virtual setting DB 414 of the target virtual device DB 413 via the virtual setting storage unit 308, and then returns the processing to step S812.

If, in step S814, it is determined that the setting type of the setting value identifier selected in step S813 is "individual" (NO in step S814), the virtual setting updating unit 309 returns the processing to step S812.

If, in step S812, it is determined that there is no setting value identifier that is not yet subjected to updating determination (NO in step S812), the virtual setting updating unit 309 ends the processing in the flowchart of FIG. 8B.

FIG. 8C is a flowchart illustrating an example of the configuration-related setting update processing performed in step S808 illustrated in FIG. 8A. The steps in the flowchart of FIG. 8C are implemented by the CPU 201 included in the setting value management server 110 loading a program stored in a memory, such as the ROM 202, onto the RAM 203 and executing the program. Furthermore, the flowchart of FIG. 8C illustrates processing performed from the time when the virtual setting updating unit 309 starts the configuration-related setting update processing to the time when the virtual setting updating unit 309 registers the influenced setting value. Moreover, in the flowchart of FIG. 8C, the processing starts at the time when the virtual setting updating unit 309 performs the configuration-related setting update processing.

In step S821, the virtual setting updating unit 309 determines whether there is an attribute that is not yet subjected to updating determination among the license or accessory attribute updated in step S804 illustrated in FIG. 8A. If it is determined that there is an attribute that is not yet subjected to updating determination (YES in step S821), the virtual setting updating unit 309 advances the processing to step S822.

In step S822, the virtual setting updating unit 309 selects one attribute that is not yet subjected to updating determination from among the updated license or accessory attribute, and then advances the processing to step S823.

In step S823, the virtual setting updating unit 309 specifies, via the setting value information acquisition unit 303, the setting value identifiers of setting values that are influenced by updating of the device configuration information attribute selected in step S822, records the specified setting value identifiers into the RAM 203, and then advances the processing to step S824.

In step S824, the virtual setting updating unit 309 determines whether the updating content of the device configuration information attribute selected in step S823 is addition or change.

If it is determined that the updating content is addition or change (YES in step S824), the virtual setting updating unit 309 advances the processing to step S825.

In step S825, the virtual setting updating unit 309 determines whether there is a setting value identifier that is not yet subjected to updating determination among the setting value identifiers specified in step S823. If it is determined that there is a setting value identifier that is not yet subjected to updating determination (YES in step S825), the virtual setting updating unit 309 advances the processing to step S826.

In step S826, the virtual setting updating unit 309 selects one setting value identifier that is not yet subjected to updating determination from among the setting value identifiers specified in step S823, and then advances the processing to step S827.

In step S827, the virtual setting updating unit 309 determines whether the setting type of the setting value identifier selected in step S826 is "common", and then records, into the RAM 203, information indicating that the selected setting value identifier has been subjected to updating determination.

If it is determined that the setting type of the setting value identifier selected in step S826 is "common" (YES in step S827), the virtual setting updating unit 309 advances the processing to step S828.

In step S828, the virtual setting updating unit 309 reads out, from the common setting storage unit 307, a value that is set to the setting value identifier selected in step S826. Furthermore, the virtual setting updating unit 309 acquires metadata of the selected setting value identifier from the setting value information acquisition unit 303. Then, the virtual setting updating unit 309 converts the read-out common setting value into a value to be registered with the target virtual device DB 413, according to information of the metadata, and then advances the processing to step S829.

In step S829, the virtual setting updating unit 309 registers the value converted in step S828 with the virtual setting DB 414 of the target virtual device DB 413 via the virtual setting storage unit 308, and then returns the processing to step S825.

On the other hand, if, in step S827, it is determined that the setting type of the setting value identifier selected in step S826 is "individual" (NO in step S827), the virtual setting updating unit 309 directly returns the processing to step S825.

If, in step S825, it is determined that there is no setting value identifier that is not yet subjected to updating determination among the setting value identifiers specified in step S823 (NO in step S825), the virtual setting updating unit 309 returns the processing to step S821.

Furthermore, if, in step S824, it is determined that the updating content of the device configuration information attribute selected in step S822 is neither addition nor change (NO in step S824), the virtual setting updating unit 309 advances the processing to step S830.

In step S830, the virtual setting updating unit 309 determines whether the updating content of the device configuration information attribute selected in step S822 is deletion. If it is determined that the updating content is deletion (YES in step S830), the virtual setting updating unit 309 advances the processing to step S831.

In step S831, the virtual setting updating unit 309 determines whether there is a setting value identifier that is not yet subjected to update processing among the setting value identifiers specified in step S823. If it is determined that there is a setting value identifier that is not yet subjected to update processing (YES in step S831), the virtual setting updating unit 309 advances the processing to step S832.

In step S832, the virtual setting updating unit 309 selects one setting value identifier that is not yet subjected to update processing from among the setting value identifiers specified in step S823, records, into the RAM 203, information indicating that the selected setting value identifier has been subjected to updating determination, and then advances the processing to step S833.

In step S833, the virtual setting updating unit 309 acquires, from the setting value information acquisition unit 303, metadata of the setting value identifier selected in step S832. Furthermore, the virtual setting updating unit 309 reads out an initial value from the acquired metadata, registers the acquired initial value with the virtual setting DB 414 of the target virtual device DB 413 via the virtual setting storage unit 308, and then returns the processing to step S831.

If, in step S831, it is determined that there is no setting value identifier that is not yet subjected to update processing (NO in step S831), the virtual setting updating unit 309 returns the processing to step S821.

Furthermore, if, in step S830, it is determined that the updating content of the device configuration information attribute selected in step S822 is not deletion (NO in step S830), the virtual setting updating unit 309 returns the processing to step S821.

Furthermore, if, in step S821, it is determined that there is no attribute that is not yet subjected to updating determination among the license or accessory attribute updated in step S804 illustrated in FIG. 8A (NO in step S821), the virtual setting updating unit 309 ends the processing in the flowchart of FIG. 8C.

As described above, according to the second exemplary embodiment, in a case where device configuration information of the multifunction peripheral 120 has been updated, the virtual device DB 413 can be updated in conjunction with updating of the device configuration information without causing mismatching of setting values. Furthermore, even in a case where common setting is included in setting values to be updated in conjunction with updating of the device configuration information, the content of updating can be reflected in the setting values without causing mismatching of setting values.

In the above-described first exemplary embodiment, in a case where a setting value has been changed and, in the above-described second exemplary embodiment, in a case where device configuration has been changed, an example in which the device setting can be updated with matching of setting values kept has been described. Besides, the case of updating the device setting may include a case where the management setting of a policy has been changed. Accordingly, in a third exemplary embodiment, a method of updating a device setting without causing mismatching in a case where the management setting of a policy has been changed is described. In the third exemplary embodiment, the same portions as those of the first and second exemplary embodiments are omitted from description, and only different portions are described.

The policy management setting, which is a setting value used to manage a policy, is a type of setting values (configuration data) that the multifunction peripheral 120 uses. When the value of the policy management setting is set, a policy rule (an example of which is shown in Table 8 below) corresponding to the policy management setting can be read out, the value of a setting value specified by the policy rule can be changed, and the setting value can be changed into a policy control state. In a setting value set to the policy control state, "ON" is set to the policy control attribute. A setting value the policy control attribute of which is set to "ON" is treated as a read-only setting value. As the value of the policy management setting is changed, a setting value the policy control state of which is set to "OFF" is changed into a readable and writable state.

Setting values related to a policy include a setting value used to manage the policy (the above-mentioned policy management setting) and a policy target setting value the value of which is determined according to an associated policy rule. The policy management setting is a setting value used to manage whether to control the value of the policy target setting value based on the associated policy rule. On the other hand, the policy target setting value is a setting value targeted to be managed by the policy management setting as to whether the value of the setting value is controlled according to the associated policy rule. The relationship between the policy management setting and the policy target setting value corresponds to the relationship between the management source and the management target. A setting value the policy of which is indicated with "manage" is the policy management setting, and a setting value the policy of which is indicated with "target" is the policy target setting value.

In the example shown in Table 1, a setting value the setting value identifier of which is indicated with "policy.external_device_restrict" is a setting to manage a policy of inhibiting the use of an external device, and the policy attribute thereof is set to "manage". Furthermore, a setting value the setting value identifier of which is indicated with "settings.usb_enable" is a setting value related to the use of a universal serial bus (USB) device, and the policy attribute thereof is set to "target". In a case where the setting value the policy attribute of which is "target" is set to be managed by the setting value the policy control of which is "manage" according to the associated policy, the value of the policy target setting value is changed based on the policy rule.

Table 8 below is a table illustrating an example of the policy rule.

TABLE 8

Policy Rule Table

| Policy Management Setting | Value | Policy Target Setting Value Identifier | Value | Policy Control |
|---|---|---|---|---|
| policy.external_device_restrict | OFF | settings.usb_enable | — | OFF |

TABLE 8-continued

Policy Rule Table

| Policy Management Setting | Value | Policy Target Setting Value Identifier | Value | Policy Control |
|---|---|---|---|---|
| | ON | settings.usb_enable | OFF | ON |

In table 8, in a case where the setting value indicated with the setting value identifier "policy.external_device_restrict" has been changed to "ON", the policy target setting value identifier "settings.usb_enable" is changed to "OFF", and the policy control is changed to "ON". In a case where the setting value indicated with the setting value identifier "policy.external_device_restrict" has been changed to "OFF", the policy control is changed to "OFF" without changing the value of the policy target setting value identifier "settings.usb_enable".

Furthermore, the policy rule is a predetermined rule that has been previously generated, which is stored in the virtual policy control unit 313 and the policy control unit 325 described below. Moreover, the data shown in Table 8 is merely an example, and is not seen to be limiting.

Now, the virtual policy control unit 313 of the setting value management service 300 illustrated in FIG. 3 is described.

The virtual policy control unit 313 reads out a policy rule corresponding to the changed setting, and requests the virtual setting updating unit 309 to change the value and the policy control attribute of the setting value according to the policy rule. This causes the virtual device DB 413 to be changed according to the policy rule. Furthermore, in the setting value management service 300, the virtual policy control unit 313 stores and manages the policy rule in the HDD 204.

Next, the policy control unit 325 of the multifunction peripheral firmware 320 is described.

In a case where the device setting value management unit 322 has accepted a change of the policy setting, the device setting value management unit 322 notifies the policy control unit 325 of the accepted content. The policy control unit 325 reads out a policy rule corresponding to the changed setting, and requests the device setting value management unit 322 to change the value and the policy control attribute of the setting value according to the policy rule. This causes the device setting value DB to be changed according to the policy rule. Furthermore, in the multifunction peripheral firmware 320, the policy control unit 325 stores and manages the policy rule in the HDD 224. However, the policy rule may be stored and managed in the setting value information DB 410 or the device setting value DB. Moreover, the policy rule stored in the multifunction peripheral 120 is information systematized in the same manner as that stored in the setting value management server 110.

In the following, processing performed when a setting value is changed in the multifunction peripheral 120 or the setting value management server 110 in the third exemplary embodiment is described.

FIG. 9A is a flowchart illustrating an example of processing performed when a device setting value has been changed in the multifunction peripheral 120 in the third exemplary embodiment. The steps in the flowchart of FIG. 9A are implemented by the CPU 221 included in the multifunction peripheral 120 loading a program stored in a memory, such as the ROM 222, onto the RAM 223 and executing the program. Furthermore, the flowchart of FIG. 9A illustrates processing performed from the time when the device setting value management unit 322 accepts a change of a setting value to the time when the device setting value management unit 322 registers the change of the setting value with the device setting value DB and notifies the setting value management server 110 of the change of the setting value. Moreover, in the flowchart of FIG. 9A, the processing starts at the time when the device setting value management unit 322 has accepted the change of the setting value.

The following description centers on portions different from those illustrated in FIG. 5A, and the processing operations similar to those illustrated in FIG. 5A are omitted from the description.

First, in step S901, the device setting value management unit 322 determines whether a setting value requested to be changed is policy-controlled, based on the policy control attribute of the setting value requested to be changed. If it is determined that the setting value requested to be changed is policy-controlled (the policy control is "ON") (YES in step S901), the device setting value management unit 322 ends the processing in the flowchart of FIG. 9A. Furthermore, in the above description, in step S901, the device setting value management unit 322 immediately determines the policy control attribute of a setting value requested to be changed. However, the device setting value management unit 322 may determine the policy control attribute of a setting value requested to be changed in a case where the policy of setting value information corresponding to the setting value requested to be changed is "target".

On the other hand, if, in step S901, it is determined that the setting value requested to be changed is not policy-controlled (the policy control is "OFF") (NO in step S901), the device setting value management unit 322 advances the processing to step S501. Steps S501 to S503 are similar to those illustrated in FIG. 5A in the first exemplary embodiment. Upon completion of step S503, the processing proceeds to step S902.

In step S902, the device setting value management unit 322 determines whether the setting value requested to be changed is the policy management setting. If it is determined that the setting value requested to be changed is not the policy management setting (NO in step S902), the device setting value management unit 322 advances the processing to step S504. Step S504 and subsequent steps are similar to those illustrated in FIG. 5A in the first exemplary embodiment and are, therefore, omitted from the description.

On the other hand, if, in step S902, it is determined that the setting value requested to be changed is the policy management setting (YES in step S902), the device setting value management unit 322 advances the processing to step S903.

In step S903, the device setting value management unit 322 registers the value of the policy management setting requested to be changed with the device setting value DB via the device setting value storage unit 323. Furthermore, the device setting value management unit 322 notifies the policy control unit 325 of the changed policy management setting and the value thereof, and then advances the processing to step S904.

In step S904, the policy control unit 325 reads out the policy target setting value identifier, the value, and the policy control attribute, which are registered in the policy rule according to the value of the changed policy management setting, and then advances the processing to step S905.

In step S905, the policy control unit 325 registers the value and the policy control attribute of the setting value corresponding to the policy target setting value identifier read out in step S904 with the device setting value DB via the device setting value management unit 322, and then advances the processing to step S506. Then, in step S506, the device setting value management unit 322 requests the device setting value communication unit 321 to notify the setting value management server 110 of the contents of the setting change registered with the device setting value DB in steps S903 and S905. In step S507, the device setting value management unit 322 instructs the device setting value storage unit 323 to update the DB with the contents of the setting change.

According to the above-described processing, in a case where a policy management setting has been changed in the multifunction peripheral 120, the value and the policy control attribute of a setting value associated with the policy management setting can be changed and the setting value management server 110 can be notified of the content of the changed policy management setting.

FIG. 9B is a flowchart illustrating an example of processing performed when the setting value management server 110 has accepted setting editing processing. The steps in the flowchart of FIG. 9B are implemented by the CPU 201 included in the setting value management server 110 loading a program stored in a memory, such as the ROM 202, onto the RAM 203 and executing the program. Furthermore, the flowchart of FIG. 9B illustrates processing performed from the time when the setting editing unit 311 accepts editing of a setting value to the time when the setting editing unit 311 registers the content of the accepted editing with the server management data 401. Moreover, in the flowchart of FIG. 9B, the processing starts at the time when the setting editing unit 311 accepts a setting value editing request.

The following description centers on portions different from those illustrated in FIG. 6, and the processing operations similar to those illustrated in FIG. 6 are omitted from the description.

In step S911, the setting editing unit 311 reads out the policy control attribute of a setting value the editing of which has been accepted, from the common setting storage unit 307, and determines whether the setting value is policy-controlled. If it is determined that the setting value is policy-controlled (YES in step S911), the setting editing unit 311 ends the processing in the flowchart of FIG. 9B. Furthermore, in the above description, in step S911, the setting editing unit 311 immediately determines the policy control attribute of a setting value requested to be edited. However, the setting editing unit 311 may determine the policy control attribute of a setting value requested to be edited in a case where the policy of metadata corresponding to the setting value is "target".

On the other hand, if, in step S911, it is determined that the setting value the editing of which has been accepted is not policy-controlled (NO in step S911), the setting editing unit 311 performs the same processing as that in the first exemplary embodiment, and then advances the processing to step S912.

Figure 10A:
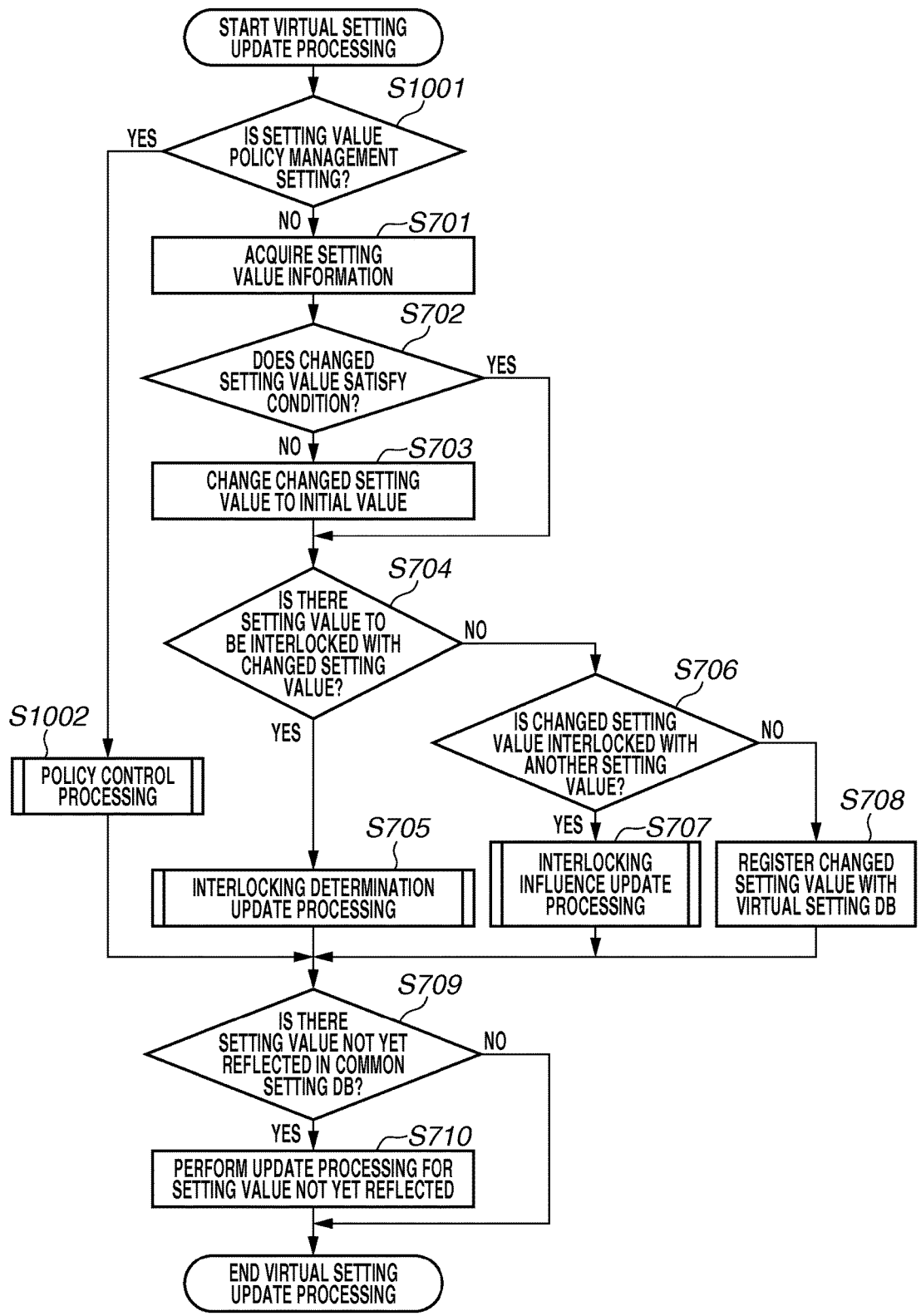
FIG. 10A is a flowchart illustrating virtual setting update processing according to the third exemplary embodiment.
Figure 10B:
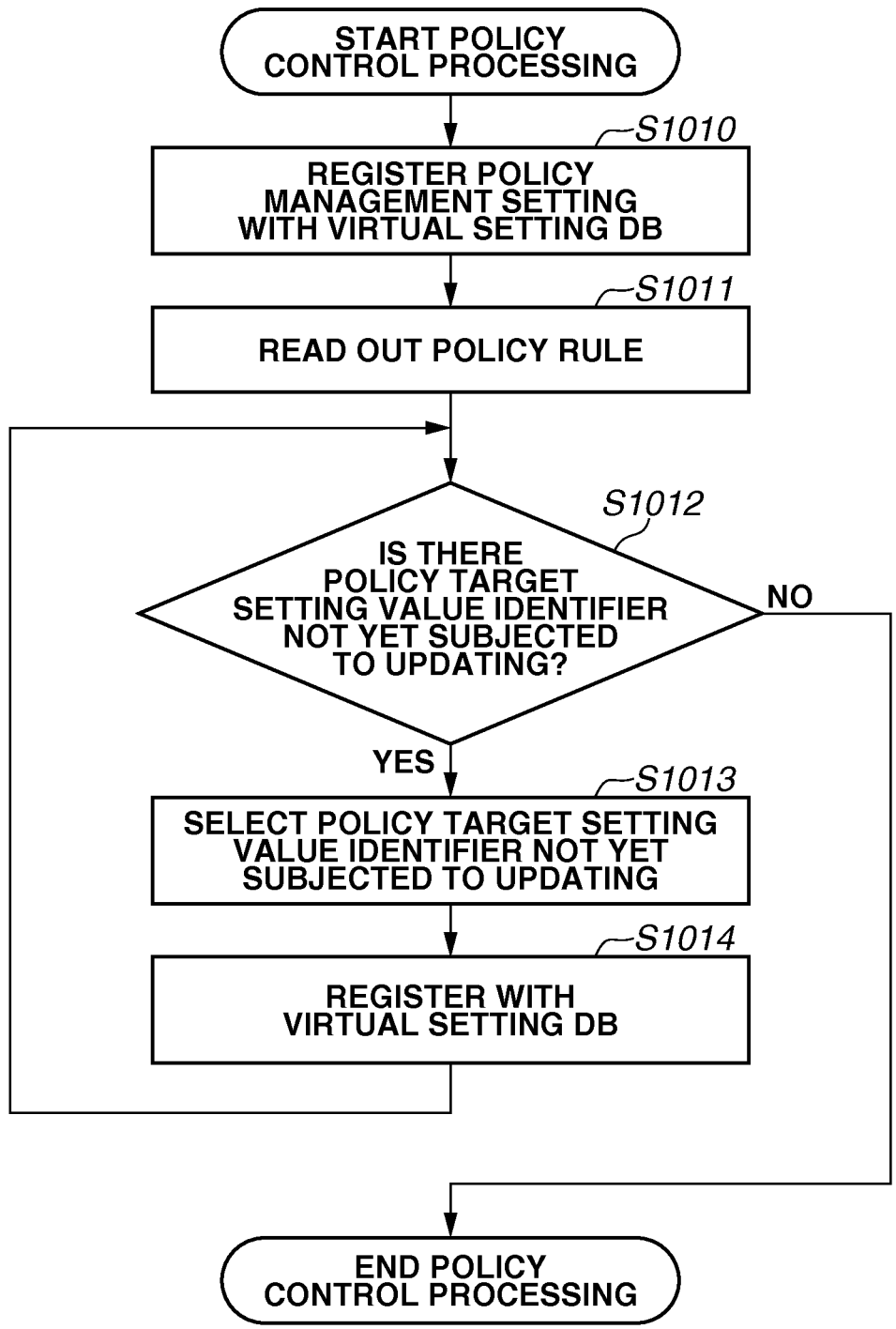
FIG. 10B is a flowchart illustrating policy control processing according to the third exemplary embodiment.

In step S912, the setting editing unit 311 determines, by inquiring of the setting value information acquisition unit 303, whether the setting value the editing of which has been accepted is the policy management setting, using the setting value identifier of the setting value the editing of which has been accepted. If it is determined that the setting value is not the policy management setting (NO in step S912), the setting editing unit 311 advances the processing to step S602. Step S602 and subsequent steps are similar to those illustrated in FIG. 6 in the first exemplary embodiment. However, the virtual setting update processing in step S606 is performed as illustrated in the flowchart of FIGS. 10A and 10B, which are described below.

On the other hand, if, in step S912, it is determined that the setting value is the policy management setting (YES in step S912), the setting editing unit 311 advances the processing to step S913.

In step S913, the setting editing unit 311 requests the common setting updating unit 306 to update the policy management setting the editing of which has been accepted. The common setting updating unit 306 registers the value of the policy management setting the editing of which has been accepted with the common setting DB 411 via the common setting storage unit 307, and then advances the processing to step S604. Then, in the virtual setting update processing in step S606, the virtual setting updating unit 309 performs processing illustrated in the flowcharts of FIGS. 10A and 10B, which are described below, thus registering, with the common setting DB 411 and the virtual device DB 413, the policy control attribute of the setting value updated in interlocking with the policy management setting.

With the above-described processing, in a case where the policy management setting has been changed in the setting value management server 110, the value and the policy control attribute of the associated setting value can be registered with the common setting DB 411 and the virtual device DB 413.

FIG. 10A is a flowchart illustrating an example of virtual setting update processing performed when the virtual setting updating unit 309 has accepted the setting value identifier and the value of the setting value to be updated. The steps in the flowchart of FIG. 10A are implemented by the CPU 201 included in the setting value management server 110 loading a program stored in a memory, such as the ROM 202, onto the RAM 203 and executing the program. Furthermore, the flowchart of FIG. 10A illustrates processing performed from the time when the virtual setting updating unit 309 accepts a setting updating request to the time when the virtual setting updating unit 309 updates the virtual device DB 413. Moreover, in the flowchart of FIG. 10A, the processing starts at the time when the virtual setting updating unit 309 has accepted the setting value identifier and the value of the setting value to be changed.

The following description centers on portions different from those illustrated in FIG. 7A, and the processing operations similar to those illustrated in FIG. 7A are omitted from the description.

In step S1001, the virtual setting updating unit 309 acquires, from the setting value information acquisition unit 303, metadata associated with the setting value identifier accepted from the device communication unit 310, the common setting updating unit 306, or the setting editing unit 311. Furthermore, the virtual setting updating unit 309 determines whether the setting value to be changed is the policy management setting.

If it is determined that the setting value to be changed is not the policy management setting (NO in step S1001), the virtual setting updating unit 309 advances the processing to step S701. In steps S701 to S710, processing operations similar to those in the first exemplary embodiment are performed.

On the other hand, if, in step S1001, it is determined that the setting value to be changed is the policy management setting (YES in step S1001), the virtual setting updating unit 309 advances the processing to step S1002.

In step S1002, the virtual setting updating unit 309 performs policy control processing. The details of the policy control processing are described below with reference to FIG. 10B. Upon completion of the policy control processing, the virtual setting updating unit 309 advances the processing to step S709. Step S709 and subsequent steps are similar to those illustrated in FIG. 7A in the first exemplary embodiment.

FIG. 10B is a flowchart illustrating an example of policy control processing performed by the virtual setting updating unit 309 in the setting value management server 110. The steps in the flowchart of FIG. 10B are implemented by the CPU 201 included in the setting value management server 110 loading a program stored in a memory, such as the ROM 202, onto the RAM 203 and executing the program. Furthermore, the flowchart of FIG. 10B illustrates processing performed from the time when the virtual setting updating unit 309 starts the policy control processing to the time when the virtual setting updating unit 309 registers the settings with respect to the policy rule. Moreover, in the flowchart of FIG. 10B, the processing starts at the time when the virtual setting updating unit 309 has performed the policy control processing.

In step S1010, the virtual setting updating unit 309 registers the value of the policy management setting accepted in step S1001 illustrated in FIG. 10A with the virtual setting DB 414 of the target virtual device DB 413 via the virtual setting storage unit 308. Then, the virtual setting updating unit 309 requests the virtual policy control unit 313 to perform policy control, and then advances the processing to step S1011.

In step S1011, the virtual policy control unit 313 reads out the policy target setting value identifiers, values, and policy control attributes, which are registered in the policy rule corresponding to the changed policy management setting, and then advances the processing to step S1012.

In step S1012, the virtual policy control unit 313 determines whether there is a policy target setting value identifier not yet subjected to updating among the policy target setting value identifiers read out in step S1011. If it is determined that there is a policy target setting value identifier not yet subjected to updating (YES in step S1012), the virtual policy control unit 313 advances the processing to step S1013.

In step S1013, the virtual policy control unit 313 selects one policy target setting value identifier not yet subjected to updating, and then advances the processing to step S1014.

In step S1014, the virtual policy control unit 313 requests the virtual setting updating unit 309 to update the virtual setting DB 414 of the target virtual device DB 413 with the value and the policy control attribute corresponding to the policy target setting value identifier selected in step S1013. The virtual setting updating unit 309 registers updating of the value and policy control of the accepted setting values with the virtual setting DB 414 via the virtual setting storage unit 308, and notifies the virtual policy control unit 313 of the completion of the registration. The virtual policy control unit 313 records, in the RAM 203, information indicating that the policy target setting value identifier selected in step S1013 has been updated, and then returns the processing to step S1012.

If, in step S1012, it is determined that there is no policy target setting value identifier not yet subjected to updating among the policy target setting value identifiers read out in step S1011 (NO in step S1012), the virtual policy control unit 313 ends the processing in the flowchart of FIG. 10B.

As described above, according to the third exemplary embodiment, while a setting value is preferentially managed by policy control, the occurrence of a mismatched state in the virtual device DB 413 can be prevented. Furthermore, while the third exemplary embodiment has been described with policy control taken as an example, the control for preferentially performing setting is not limited to policy control. For example, the control for preferentially performing setting may be implemented by a method of setting priority to a setting value and prioritizing a higher-priority setting.

As described in the foregoing exemplary embodiments, in the setting value management server 110, in a case where a change request for changing a setting value has been received from a multifunction peripheral or the setting editing unit 311, the virtual setting updating unit 309 determines a relationship between the setting value requested to be changed and another setting value (policy, interlocking specification, etc.) based on metadata managed in the setting value information DB 410 (steps S1001, S704, and S706), and controls update processing of a setting value managed in the virtual setting DB 414 according to the change request based on the determined relationship (policy control processing in step S1002, interlocking determination update processing in step S705, interlocking influence update processing in step S707, and registration processing in step S708). With this configuration, while setting values of information processing apparatuses, such as the multifunction peripherals 120 and 121, are collectively managed by the setting value management server 110, even when a setting value is changed in either the information processing apparatus or the setting value management server 110, the occurrence of mismatching of setting values can be prevented.

For example, there are setting values correlated with other setting values. If such setting values are conventionally changed separately in the information processing apparatus and the server, the mutual relationship of the setting values may become mismatched. Furthermore, if common setting values that are synchronized between a plurality of information processing apparatuses are conventionally changed based on a specific setting of a particular information processing apparatus, the setting values of the other information processing apparatuses to be synchronized may become mismatched. Moreover, in a case where the configuration of an information processing apparatus has been conventionally changed, a setting value to be influenced by the changed configuration may become mismatched with the changed configuration. However, according to the exemplary embodiments, even in such cases, the occurrence of mismatching of setting values can be prevented.

Accordingly, the administrator can readily update setting values of an information processing apparatus while maintaining matching of the setting values without regard for the place of change of a setting value (in an information processing terminal, such as the multifunction peripheral 120, or 121 or the setting value management server 110) or a manner in which the setting value is set (policy, interlocking specification, common setting, or individual setting).

According to the above-described exemplary embodiments, while setting values of information processing apparatuses are collectively managed by a management apparatus, a setting value can be changed in either an information processing apparatus or the management apparatus, and the occurrence of mismatching of setting values can be prevented.

Furthermore, the above-described configuration and content of various data are not restrictive but may be changed or altered in various manners according to the intended use or purpose.

While various exemplary embodiments have been described above, aspects of the present invention can be embodied as, for example, a system, an apparatus, a method, a program, or a storage medium. More specifically, aspects of the present invention can be applied to a system composed of a plurality of devices or can be applied to an apparatus composed of a single device.

Furthermore, a configuration obtained by combining all of part of the above-described exemplary embodiments can be involved in aspects of the present invention.

Exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-156288 filed Jul. 31, 2014, which is hereby incorporated by reference herein in its entirety.

What is claimed is:

1. An information processing apparatus that communicates with a first device and a second device, the information processing apparatus comprising:
    a management unit configured to manage a plurality of pieces of setting information that the first device uses and a plurality of pieces of setting information that the second device uses;
    an acceptance unit configured to accept a change instruction for changing setting information that the first device uses;
    a processing unit configured to perform synchronization processing for synchronizing at least a part of pieces of setting information from among the plurality of pieces of setting information that the first device uses and at least a part of pieces of setting information from among the plurality of pieces of setting information that the second device uses; and
    a control unit configured to, in a case where, if setting information that the second device uses is synchronized with setting information obtained by changing the setting information that the first device uses according to the change instruction, the plurality of pieces of setting information that the second device uses becomes mismatched with one another, cancel the setting information that the first device uses from being changed according to the change instruction.

2. The information processing apparatus according to claim 1, wherein the management unit manages whether each setting information is setting information to be used in common between a plurality of devices, and
    wherein, in a case where there is second setting information that the first device uses that is changed in interlocking with first setting information that the first device uses being changed according to the change instruction, the control unit determines whether to cancel the first setting information from being changed according to the change instruction based on whether the second setting information is setting information to be used in common between a plurality of devices.

3. The information processing apparatus according to claim 2, wherein, in a case where the first setting information subjected to the change instruction is setting information to be used in common between a plurality of devices, the control unit changes the first setting information and the second setting information according to the change instruction.

4. The information processing apparatus according to claim 2, wherein, in a case where the first setting information subjected to the change instruction is not setting information to be used in common between a plurality of devices and the second setting information is setting information to be used in common between a plurality of devices, the control unit determines to cancel the first setting information from being changed according to the change instruction.

5. The information processing apparatus according to claim 2, wherein the management unit manages the second setting information that the first device uses that is to be changed in interlocking with the first setting information that the first device uses being changed.

6. The information processing apparatus according to claim 5, wherein, in a case where setting information subjected to the change instruction is the second setting information, the control unit cancels the setting information subjected to the change instruction from being changed according to the change instruction.

7. The information processing apparatus according to claim 1, further comprising an editing unit configured to instruct the management unit to change setting information that the management unit manages,
    wherein the change instruction can be issued via the information processing apparatus and via the editing unit.

8. The information processing apparatus according to claim 1, wherein the management unit further manages configuration information of the information processing apparatus, and
    wherein, in a case where a change instruction for changing the configuration information managed by the management unit is issued, the control unit changes the configuration information based on the change instruction and requests the management unit to change setting information that is influenced by the changed configuration information.

9. The information processing apparatus according to claim 1, wherein the management unit further manages a condition for using each setting information and information indicating an initial value, and wherein, in a case where a value obtained by changing setting information that is changed according to the change instruction does not satisfy the condition managed by the management unit, the control unit changes the value of the setting information subjected to the change instruction to the initial value managed by the management unit.

10. The information processing apparatus according to claim 1, wherein the information processing apparatus is an image forming apparatus.

11. The information processing apparatus according to claim 1, wherein the management unit further manages whether each setting information is setting information to be used in common between a plurality of devices, and wherein the processing unit performs the synchronization processing with respect to the setting information to be used in common between a plurality of devices and does not perform the synchronization processing with respect to setting information that is not the setting information to be used in common between a plurality of devices.

12. An information processing apparatus that communicates with a first device and a second device, the information processing apparatus comprising:

a management unit configured to manage a plurality of pieces of setting information that the first device uses and a plurality of pieces of setting information that the second device uses;

an acceptance unit configured to accept a change instruction for changing first setting information that the first device uses;

a change unit configured to change second setting information that the first device uses according to the first setting information that the first device uses being changed according to the change instruction;

a synchronization processing unit configured to synchronize third setting information that the second device uses with the second setting information that the first device uses;

a determination unit configured to determine whether the third setting information synchronized with the second setting information changed by the change unit is matched with other setting information that the second device uses; and a control unit configured to, in a case where the determination unit determines that the third setting information is not matched with the other setting information, cancel the first setting information from being changed according to the change instruction.

13. The information processing apparatus according to claim 12, wherein the management unit further manages whether each setting information is setting information to be used in common between a plurality of devices, and wherein the synchronization processing unit performs synchronization processing with respect to the setting information to be used in common between a plurality of devices and does not perform the synchronization processing with respect to setting information that is not the setting information to be used in common between a plurality of devices.

14. An information processing system including an information processing apparatus that connects to a first device and a second device, the first device, and the second device, the information processing system comprising:

a management unit configured to manage a plurality of pieces of setting information that the first device uses and a plurality of pieces of setting information that the second device uses;

an acceptance unit configured to accept a change instruction for changing setting information that the first device uses;

a processing unit configured to perform synchronization processing for synchronizing at least a part of pieces of setting information among the plurality of pieces of setting information that the first device uses and at least a part of pieces of setting information among the plurality of pieces of setting information that the second device uses; and a control unit configured to, in a case where, if setting information that the second device uses is synchronized with setting information obtained by changing the setting information that the first device uses according to the change instruction, the plurality of pieces of setting information that the second device uses becomes mismatched with one another, cancel the setting information that the first device uses from being changed according to the change instruction.

15. A control method for an information processing apparatus that communicates with a first device and a second device, the control method comprising:

managing a plurality of pieces of setting information that the first device uses and a plurality of pieces of setting information that the second device uses;

synchronizing at least a part of pieces of setting information from among the plurality of pieces of setting information that the first device uses and at least a part of pieces of setting information from among the plurality of pieces of setting information that the second device uses;

accepting a change instruction for changing setting information that the first device uses; and canceling, in a case where, if setting information that the second device uses is synchronized with setting information obtained by changing the setting information that the first device uses according to the change instruction, the plurality of pieces of setting information that the second device uses becomes mismatched with one another, the setting information that the first device uses from being changed according to the change instruction.

16. The control method according to claim 15, further comprising:

managing whether each setting information is setting information to be used in common between a plurality of devices; and determining, in a case where there is second setting information that the first device uses that is changed in interlocking with first setting information that the first device uses being changed according to the change instruction, whether to cancel the first setting information from being changed according to the change instruction based on whether the second setting information is setting information to be used in common between a plurality of devices.

17. The control method according to claim 16, further comprising canceling, in a case where the setting information subjected to the change instruction is not setting information to be used in common between a plurality of devices and setting information that the first device uses that is changed in interlocking with the setting information subjected to the change instruction is setting information to be used in common between a plurality of devices, the setting information that the first device uses from being changed according to the change instruction.

18. A non-transitory computer-readable storage medium storing computer executable instructions that cause a computer to perform a control method for an information processing apparatus that communicates with a first device and a second device, the control method comprising:
   managing a plurality of pieces of setting information that the first device uses and a plurality of pieces of setting information that the second device uses;
   synchronizing at least a part of pieces of setting information from among the plurality of pieces of setting information that the first device uses and at least a part of pieces of setting information from among the plurality of pieces of setting information that the second device uses;
   accepting a change instruction for changing setting information that the first device uses; and
   canceling, in a case where, if setting information that the second device uses is synchronized with setting information obtained by changing the setting information that the first device uses according to the change instruction, the plurality of pieces of setting information that the second device uses becomes mismatched with one another, the setting information that the first device uses from being changed according to the change instruction.

\* \* \* \* \*